US00RE44563E

(19) United States
(12) Reissued Patent
Yamashita et al.

(10) Patent Number: US RE44,563 E
(45) Date of Reissued Patent: Oct. 29, 2013

(54) PIXEL CIRCUIT AND DISPLAY APPARATUS

(75) Inventors: Junichi Yamashita, Tokyo (JP); Katsuhide Uchino, Kanagawa (JP)

(73) Assignee: Sony Corporation, Tokyo (JP)

(21) Appl. No.: 13/357,237

(22) Filed: Jan. 24, 2012

Related U.S. Patent Documents

Reissue of:
(64) Patent No.: 7,659,872
Issued: Feb. 9, 2010
Appl. No.: 11/526,600
Filed: Sep. 26, 2006

(30) Foreign Application Priority Data

Oct. 7, 2005 (JP) ..... 2005-294308

(51) Int. Cl.
*G09G 3/30* (2006.01)

(52) U.S. Cl.
USPC ..... 345/80; 345/206; 345/92

(58) Field of Classification Search
USPC ..... 345/76, 77, 80, 90, 92, 204, 205, 206
See application file for complete search history.

(56) References Cited

U.S. PATENT DOCUMENTS

| | | | | |
|---|---|---|---|---|
| 6,356,029 | B1 * | 3/2002 | Hunter | 315/169.1 |
| 6,876,345 | B2 * | 4/2005 | Akimoto et al. | 345/76 |
| 7,042,426 | B2 * | 5/2006 | Shin | 345/76 |
| 7,535,442 | B2 * | 5/2009 | Yamashita et al. | 345/76 |
| 7,659,872 | B2 * | 2/2010 | Yamashita et al. | 345/80 |
| 2004/0046164 | A1 | 3/2004 | Kobayashi et al. | |
| 2004/0095297 | A1 * | 5/2004 | Libsch et al. | 345/76 |
| 2004/0263506 | A1 * | 12/2004 | Koyama et al. | 345/204 |
| 2005/0269959 | A1 | 12/2005 | Uchino et al. | |
| 2006/0028409 | A1 * | 2/2006 | Numao | 345/76 |
| 2006/0061560 | A1 | 3/2006 | Yamashita et al. | |

FOREIGN PATENT DOCUMENTS

| | | | |
|---|---|---|---|
| EP | 1 496 495 | A2 | 1/2005 |
| JP | 10-214042 | | 8/1998 |
| JP | 2002-072923 | A | 3/2002 |
| JP | 2002-297053 | A | 10/2002 |
| JP | 2003-228299 | A | 8/2003 |
| JP | 2003-255856 | A | 9/2003 |
| JP | 2003-255895 | A | 9/2003 |
| JP | 2003-255897 | A | 9/2003 |

(Continued)

OTHER PUBLICATIONS

EP Search Report, dated Feb. 20, 2007.

(Continued)

*Primary Examiner* — Tom Sheng
(74) *Attorney, Agent, or Firm* — Rader, Fishman & Grauer PLLC

(57) ABSTRACT

Disclosed herein is a pixel circuit that includes a correcting section configured to correct the input voltage sampled in the pixel capacitance in order to cancel out the dependency of the output current on the carrier mobility. In the pixel circuit, the correcting section operates depending on the control signal supplied from the scanning line to extract the output current from the drive transistor and introduce the extracted output current into a capacitance of the light-emitting device and the pixel capacitance, thereby correcting the input voltage. The pixel circuit further includes an additional capacitance added to the capacitance of the light-emitting device. In the pixel circuit, a portion of the output current extracted from the drive transistor flows into the additional capacitance to give a time margin to operation of the correcting section.

26 Claims, 16 Drawing Sheets

(56) References Cited

FOREIGN PATENT DOCUMENTS

| | | | |
|---|---|---|---|
| JP | 2003-271095 | | 9/2003 |
| JP | 2003-271095 | A | 9/2003 |
| JP | 2004-029791 | | 1/2004 |
| JP | 2004-093682 | | 3/2004 |
| JP | 2004-093682 | A | 3/2004 |
| JP | 2004-133240 | | 4/2004 |
| JP | 2004-133240 | A | 4/2004 |
| JP | 2006-113564 | A | 4/2006 |
| JP | 2006-215213 | A | 8/2006 |
| JP | 2006-231911 | A | 9/2006 |
| TW | 1237913 | | 8/2005 |
| TW | 1241552 | | 10/2005 |

OTHER PUBLICATIONS

Taiwanese Office Action issued Apr. 26, 2011 for corresponding Taiwanese Application No. 95135861.

Japanese Office Action issued Sep. 6, 2011 for corresponding Japanese Application No. 2005-294308.

Japanese Office Action issued Apr. 30, 2013 for corresponding Japanese Patent No. 2011-241880.

* cited by examiner $$Ids = k\cdot (\cdot Vgs - Vth)^2 = k\cdot (\cdot V_{sig} - \cdot\ V)^2$$

PIXEL CIRCUIT AND DISPLAY APPARATUS

Matter enclosed in heavy brackets [ ] appears in the original patent but forms no part of this reissue specification; matter printed in italics indicates the additions made by reissue.

CROSS REFERENCES TO RELATED APPLICATIONS

*The present application is a reissue application of application Ser. No. 11/526,600, now U.S. Pat. No. 7,659,872, issued Feb. 9, 2010.* The present invention contains subject matter related to Japanese Patent Application JP 2005-294308 filed in the Japanese Patent Office on Oct. 7, 2005, the entire contents of which being incorporated herein by reference.

BACKGROUND OF THE INVENTION

1. Field of the Invention

The present invention relates to a pixel circuit for current-driving light-emitting devices disposed at respective pixels. The present invention is also concerned with an active-matrix display apparatus having a matrix of such pixel circuits, for controlling currents supplied to light-emitting devices, such as organic EL devices, with insulated-gate field-effect transistors disposed in the respective pixel circuits.

2. Description of the Related Art

Image display apparatuses, such as liquid-crystal display apparatuses have a matrix of liquid-crystal pixels and control the intensity of light passing through or reflected by the pixels depending on image information to display an image represented by the image information. Organic EL display apparatuses having organic EL devices as pixels also operate similarly. Unlike liquid-crystal devices, the organic EL devices are self-luminous devices. Therefore, the organic EL devices display more visible images than the liquid-crystal devices, do not require backlight, and have a high response speed. The luminance level (gradation) of each light-emitting device can be controlled by a current flowing therethrough, and hence the organic EL display apparatuses are current-controlled whereas the liquid-crystal display apparatuses are voltage-controlled.

Like the liquid-crystal display apparatuses, the organic EL display apparatuses are classified into a passive-matrix drive type and an active-matrix drive type. Though the passive-matrix drive configuration is simple in structure, it poses difficulty in producing a large-size, high-definition display apparatus. Consequently, efforts are mainly directed to developing an active-matrix display apparatus. According to the active matrix drive scheme, a current flowing through a light-emitting device in each pixel circuit is controlled by an active device (generally, a thin-film transistor or TFT) disposed in the pixel circuit. Active-matrix drive systems are disclosed in the following patent documents: Japanese Patent Laid-Open No. 2003-255856; Japanese Patent Laid-Open No. 2003-271095; Japanese Patent Laid-Open No. 2004-133240; Japanese Patent Laid-Open No. 2004-029791; Japanese Patent Laid-Open No. 2004-093682; and Japanese Patent Laid-Open No. Hei 10-214042.

SUMMARY OF THE INVENTION

In the past a pixel circuit in the past is positioned at a point of intersection between a row scanning line for supplying a control signal and a column signal line for supplying a video signal. The pixel circuit comprises at least a sampling transistor, a pixel capacitance, a drive transistor, and a light-emitting device. The sampling transistor is turned on by a control signal supplied from the scanning line and samples a video signal supplied from the signal line. The pixel capacitance holds an input voltage depending on the sampled video signal. The drive transistor supplies an output current during a predetermined light-emission period depending on an input voltage held by the pixel capacitance. Generally, the output current is dependent on the carrier mobility and the threshold voltage in a channel region of the drive transistor. In response to the output current supplied from the drive transistor, the light-emitting device emits light at a luminance level depending on the video signal.

When the input voltage held by the pixel capacitance is applied to the gate of the drive transistor, the output current flows between the source and drain of the drive transistor, energizing the light-emitting device. Generally, the luminance of light emitted from the light-emitting device is proportional to the amount of current flowing therethrough. The amount of output current supplied from the drive transistor is controlled by the gate voltage thereof, i.e., the input voltage written in the pixel capacitance. In the past the pixel circuit controls the amount of current supplied to the light-emitting device by changing the input voltage applied to the gate of the drive transistor depending on the video signal.

The drive transistor has an operating characteristic expressed by the following equation (1):

$$Ids=(1/2)\mu(W/L)Cox(Vgs-Vth)^2 \quad (1)$$

where Ids represents the drain current flowing between the source and drain, the drain current serving as the output current supplied to the light-emitting device, Vgs represents the gate voltage that is applied to the gate with respect to the source, the gate voltage serving as the input voltage referred to above in the pixel circuit, Vth represents the threshold voltage of the transistor, and μ represents the mobility in a thin semiconductor film serving as the channel of the transistor. Further W represents the channel width, L represents the channel length, and Cox represents the gate capacitance. As can be seen from the transistor characteristic equation (1), since the thin-film transistor operates in a saturated region, when the gate voltage Vgs increases in excess of the threshold voltage Vth, the transistor is turned on, causing the drain current Ids to flow. In principle, as indicated by the transistor characteristic equation (1), if the gate voltage Vgs is constant, then the drain current Ids is supplied at a constant rate to the light-emitting device at all times. Therefore, if the pixels that make up the screen are supplied with respective video signals of the same level, then all the pixels should emit light at the same luminance level, providing image uniformity over the screen.

Actually, however, thin-film transistors (TFTs) made of thin transistor films, such as of polysilicon, have individual device characteristic variations. Particularly, the threshold voltage Vth is not constant, but varies from pixel to pixel. As can be understood from the transistor characteristic equation (1), if the threshold voltage Vth varies from drive transistor to drive transistor, then even when the gate voltage Vgs is constant, the drain voltage Ids also varies from drive transistor to drive transistor, resulting in different luminance levels at the pixels and losing the image uniformity over the screen. Heretofore there have been developed pixel circuits incorporating a function to cancel threshold voltage variations of the drive transistors, as disclosed in Japanese Patent Laid-Open No. 2004-133240.

The pixel circuits incorporating a function to cancel threshold voltage variations are capable, to a certain extent, of improving the image uniformity over the screen. However, the characteristics of the polysilicon thin-film transistors indicate that not only the threshold voltage but also the mobility μ vary from device to device. As can be seen from the transistor characteristic equation (1), if the mobility μ varies, then, the drain current Ids also varies though the gate voltage Vgs is constant. As a result, the light-emission luminance varies from device to device, impairing the image uniformity over the screen.

It is desirable to provide a pixel circuit and a display apparatus for canceling the effect of a carrier mobility in a drive transistor to compensate for a variation of a drain current (output current) supplied from the drive transistor.

It is also desirable to provide a pixel circuit and a display apparatus which maintain a margin for a corrective action requisite to cancel the effect of a carrier mobility in a drive transistor, thereby stabilizing the operation of the pixel circuit and the display apparatus.

To meet the above needs, there is provided in accordance with the present invention a pixel circuit for positioning at a point of intersection between a row scanning line for supplying a control signal and a column signal line for supplying a video signal, including at least a sampling transistor, a pixel capacitance connected to the sampling transistor, a drive transistor connected to the pixel capacitance, a light-emitting device connected to the drive transistor. In the pixel circuit, the sampling transistor is turned on in response to the control signal supplied from the scanning line to sample the video signal supplied from the signal line into the pixel capacitance. The pixel capacitance applies an input voltage to a gate of the drive transistor depending on the sampled video signal. The drive transistor supplies an output current depending on the input voltage to the light-emitting device, the output current having dependency on a carrier mobility in a channel region of the drive transistor. The light-emitting device emits light at a luminance level depending on the video signal in response to the output current supplied from the drive transistor. The pixel circuit further includes a correcting section configured to correct the input voltage sampled in the pixel capacitance in order to cancel out the dependency of the output current on the carrier mobility. The correcting section operates depending on the control signal supplied from the scanning line to extract the output current from the drive transistor and introduce the extracted output current into a capacitance of the light-emitting device and the pixel capacitance, thereby correcting the input voltage. The pixel circuit still further includes an additional capacitance added to the capacitance of the light-emitting device. A portion of the output current extracted from the drive transistor flows into the additional capacitance to give a time margin to operation of the correcting section.

Preferably, in the pixel circuit, the sampling transistor, the drive transistor, and the correcting section include thin-film transistors formed on an insulating substrate, and the pixel capacitance and the additional capacitance include thin-film capacitors formed on the insulating substrate. The output current of the drive transistor has dependency on a threshold voltage as well as the carrier mobility in the carrier region, and the correcting section detects a threshold voltage of the drive transistor and adds the detected threshold voltage to the input voltage in advance in order to cancel out the dependency of the output current on the threshold voltage. The light-emitting device includes a diode-type light-emitting device having an anode connected to a source of the drive transistor and a cathode connected to ground, the additional capacitance having a terminal connected to the anode of the light-emitting device and another terminal connected to a predetermined fixed potential. The predetermined fixed potential to which another terminal of the additional capacitance is connected is selected from a ground potential on the cathode of the light-emitting device, and a positive power supply potential and a negative power supply potential of the pixel circuit. In an array of pixel circuits, each as described above, each of the pixel circuits has either one of a red light-emitting device, a green light-emitting device, and a blue light-emitting device, an the additional capacitances in the respective pixel circuits have different capacitance values for the respective light-emitting devices, thereby making times requisite to operate the correcting section in the respective pixel circuits uniform. In the array of pixel circuits, a shortage of the capacitance value of the additional capacitance in one of the pixel circuits is made up for by a portion of the additional capacitance in an adjacent one of the pixel circuits. The correcting section extracts the output current from the drive transistor and supplies the extracted output current to the pixel capacitance through a negative feedback loop to correct the input voltage while the video signal is being sampled in the pixel capacitance.

According to an embodiment of the present invention, there is also provided a display apparatus including a pixel array having a matrix of pixels each positioned at a point of intersection between a row scanning line for supplying a control signal and a column signal line for supplying a video signal, a signal unit for supplying a video signal to the signal line, and a scanner unit for supplying a control signal to the scanning line to successively scan rows of the pixels, each of the pixels including at least a sampling transistor, a pixel capacitance connected to the sampling transistor, a drive transistor connected to the pixel capacitance, and a light-emitting device connected to the drive transistor. In the display apparatus, the sampling transistor is turned on in response to the control signal supplied from the scanning line to sample the video signal supplied from the signal line into the pixel capacitance. The pixel capacitance applies an input voltage to a gate of the drive transistor depending on the sampled video signal. The drive transistor supplies an output current depending on the input voltage to the light-emitting device, the output current having dependency on a carrier mobility in a channel region of the drive transistor. The light-emitting device emits light at a luminance level depending on the video signal in response to the output current supplied from the drive transistor. Each of the pixels further includes a correcting section configured to correct the input voltage sampled in the pixel capacitance in order to cancel out the dependency of the output current on the carrier mobility. The correcting section operates depending on the control signal supplied from the scanning line to extract the output current from the drive transistor and introduce the extracted output current into a capacitance of the light-emitting device and the pixel capacitance, thereby correcting the input voltage. Each of the pixels still further includes an additional capacitance added to the capacitance of the light-emitting device. A portion of the output current extracted from the drive transistor flows into the additional capacitance to give a time margin to operation of the correcting section.

Preferably, in the display apparatus, the sampling transistor, the drive transistor, and the correcting section include thin-film transistors formed on an insulating substrate, and the pixel capacitance and the additional capacitance include thin-film capacitors formed on the insulating substrate. The output current of the drive transistor has dependency on a threshold voltage as well as the carrier mobility in the carrier region, and the correcting section detects a threshold voltage of the drive transistor and adds the detected threshold voltage to the input voltage in advance in order to cancel out the dependency of the output current on the threshold voltage. The light-emitting device includes a diode-type light-emitting device having an anode connected to a source of the drive transistor and a cathode connected to ground, the additional capacitance having a terminal connected to the anode of the light-emitting device and another terminal connected to a predetermined fixed potential. The predetermined fixed potential to which another terminal of the additional capacitance is connected is selected from a ground potential on the cathode of the light-emitting device, and a positive power supply potential and a negative power supply potential of the pixel circuit. Each of the pixels has either one of a red light-emitting device a green light-emitting device, or a blue light-emitting device, and the additional capacitances in the respective pixels have different capacitance values for the respective light-emitting devices, thereby making times requisite to operate the correcting section in the respective pixels uniform. A shortage of the capacitance value of the additional capacitance in one of the pixels is made up for by a portion of the additional capacitance in an adjacent one of the pixels. The correcting section extracts the output current from the drive transistor and supplies the extract output current to the pixel capacitance through a negative feedback loop to correct the input voltage while the video signal is being sampled in the pixel capacitance.

According to an embodiment of the present invention, the pixel circuit and the display apparatus with an integrated array of such pixel circuits have the correcting section for correcting variations of the threshold voltage and the mobility according to a voltage drive system. The pixel circuit with the correcting section includes a plurality of thin-film transistors (TFTs) integrated on an insulating substrate of glass or the like. According to an embodiment of the present invention, the additional capacitance is provided by a thin-film capacitor on the insulating substrate. The additional capacitance is connected parallel to the capacitance of the light-emitting device. With this arrangement, the total capacitance that is used to correct the mobility is a large value. As a result, an operating time requisite to correct mobility variations can be set to a long time. Specifically, a setting margin for a mobility correcting period can be increased to stabilize the corrective action of the pixel circuit.

If the display apparatus is a color display apparatus, then each of the pixel circuits has either one of a red light-emitting device, a green light-emitting device, or a blue light-emitting device. Generally, the light-emitting devices have different light-emitting areas and different light-emitting materials for the respective colors and also have different capacitive components correspondingly. The additional capacitances in the light-emitting devices may be varied to set the mobility correcting period to the same value for different color pixels. As a common time requisite for correcting the mobility is provided for all the pixels, operation of the pixel array can be controlled easily.

If a white balance is to be achieved among the red (R) pixel, the green (G) pixel, and the blue (B) pixel or the light-emitting devices in the R, G, B pixels have widely different characteristics, the additional capacitances requisite in the respective R, G, B pixels may differ largely from each other. In such a case, it is possible to assign portions of the additional capacitances among the R, G, B pixels. Specifically, if the capacitance value of the additional capacitance in the pixel circuit of a certain color suffers a shortage, then a portion of the capacitance value of the additional capacitance in an adjacent pixel circuit of another color is assigned to make up for the shortage. The display apparatus including the R, G, B pixel circuits can thus have a common mobility correcting period for the color pixels.

DETAILED DESCRIPTION OF THE PREFERRED EMBODIMENTS

Figure 1:
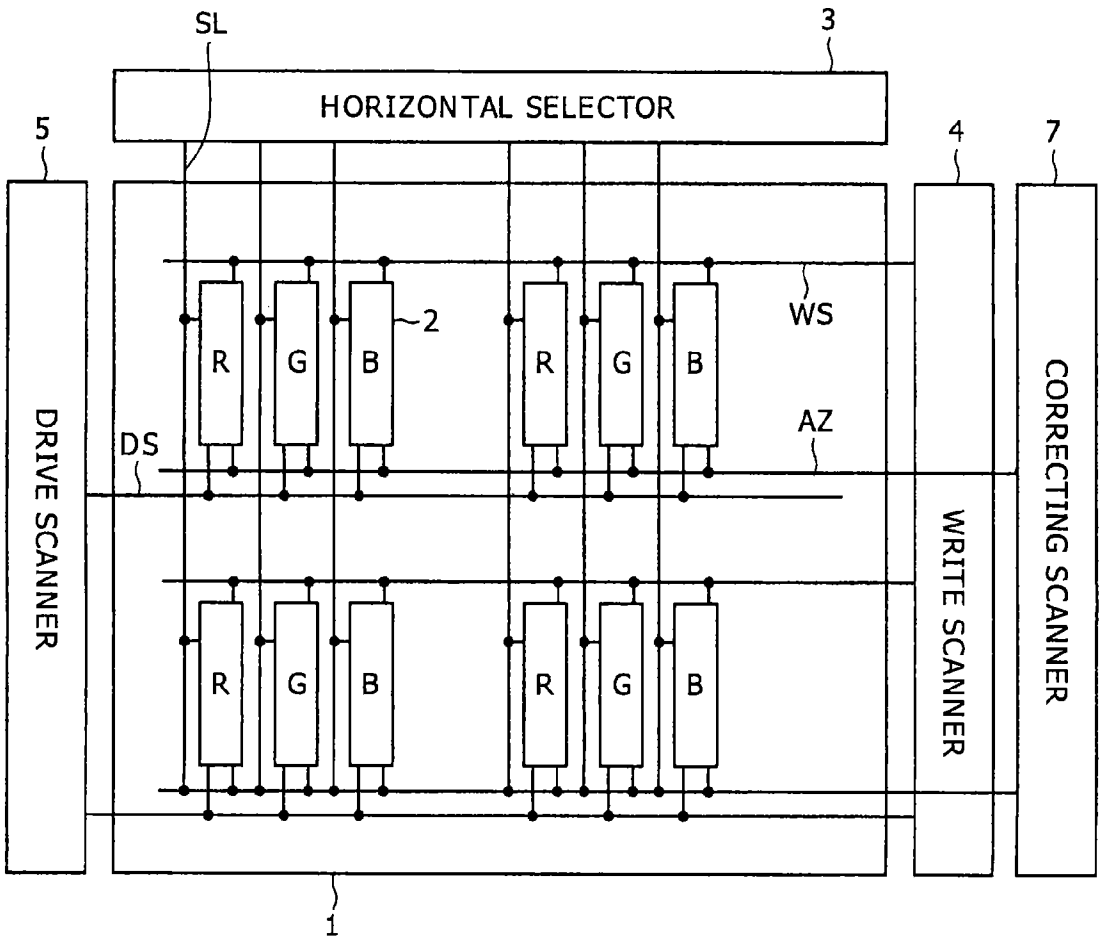
FIG. 1 is a block diagram showing a basic arrangement of a display apparatus according to an embodiment of the present invention.

FIG. 1 shows in block form a basic arrangement of a display apparatus according to an embodiment of the present invention. As shown in FIG. 1, the display apparatus, which includes an active-matrix display apparatus, has a pixel array 1 serving as a main unit and surrounding circuits. The surrounding circuits include a horizontal selector 3, a write scanner 4, a driver scanner 5, and a correcting scanner 7. The pixel array 1 includes a matrix of pixels R, G, B positioned at points of intersection between row scanning lines WS and column signal lines SL. For displaying color images, the pixel array 1 is made up of pixels R, G, B in three primaries. However, the present invention is not limited to using such pixels. Each of the pixels R, G, B includes a pixel circuit 2. The signal lines SL are driven by the horizontal selector 3. The horizontal selector 3 serves as a signal unit for supplying a video signal to the signal lines SL. The scanning lines WS are scanned by the write scanner 4. The display apparatus also has other scanning lines DS, AZ extending parallel to the scanning lines WS. The scanning lines DS are scanned by the drive scanner 5. The scanning lines AZ are scanned by the correcting scanner 7. The write scanner 4, the drive scanner 5, and the correcting scanner 7 jointly make up a scanning unit for successively scanning rows of pixels in each horizontal period. When each of the pixel circuits 2 is selected by one of the scanning lines WS, it samples a video signal from the corresponding signal line SL. When each of the pixel circuits 2 is selected by one of the scanning lines DS, it energizes a light-emitting device incorporated in the pixel circuit 2 depending on the sampled video signal. In addition, when each of the pixel circuits 2 is selected by one of the scanning lines AZ, it performs a predetermined correcting process.

The pixel array 1 is usually formed on an insulating substrate, such as glass, in the form of a flat panel. Each of the pixel circuits 2 includes amorphous silicon thin-film transistors (TFTs) or low-temperature polysilicon TFTs. If each of the pixel circuits 2 includes amorphous silicon TFTs, then the scanner unit is constructed as a TAB separate from the flat panel and is connected to the flat panel by flexible cables. If each of the pixel circuits 2 includes low-temperature polysilicon TFTs, then since the signal unit and the scanner unit can also be constructed of low-temperature polysilicon TFTs, the pixel array, the signal unit, and the scanner unit can be formed integrally on the flat panel.

Figure 2:
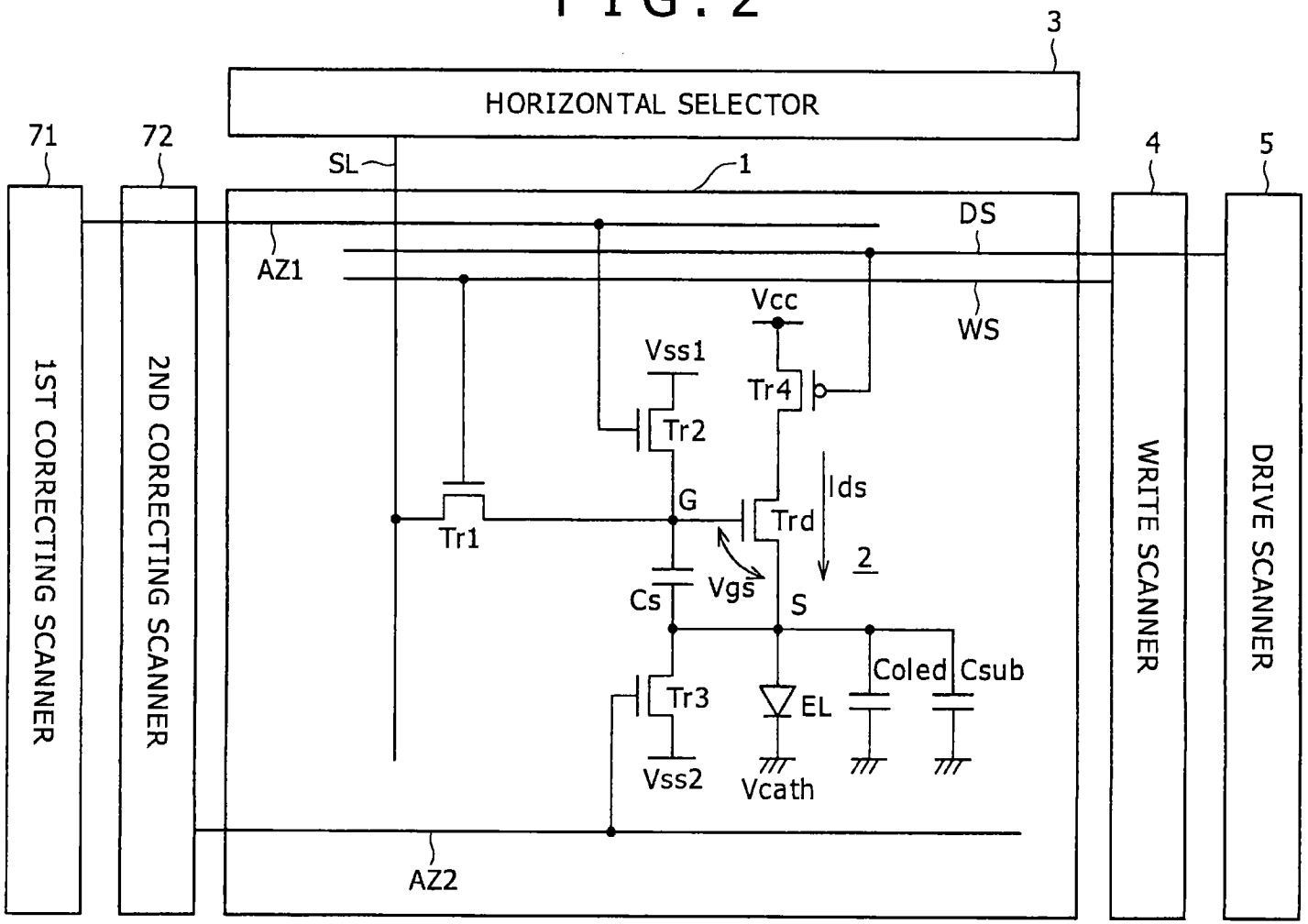
FIG. 2 is a circuit diagram, partly in block form, of a display apparatus according to a first embodiment of the present invention.

FIG. 2 is a circuit diagram, partly in block form, of an active-matrix display apparatus according to a first embodiment of the present invention. As shown in FIG. 2, the active-matrix display apparatus has a pixel array 1 serving as a main unit and surrounding circuits. The surrounding circuits include a horizontal selector 3, a write scanner 4, a driver scanner 5, a first correcting scanner 71, and a second correcting scanner 72. The pixel array 1 includes a matrix of pixel circuits 2 positioned at points of intersection between row scanning lines WS and column signal lines WL. For an easier understanding of the first embodiment, only one pixel circuit 2 is shown at an enlarged scale. The signal lines SL are driven by the horizontal selector 3. The horizontal selector 3 serves as a signal unit for supplying a video signal to the signal lines SL. The scanning lines WS are scanned by the write scanner 4. The display apparatus also has other scanning lines DS, AZ1, AZ2 extending parallel to the scanning lines WS. The scanning lines DS are scanned by the drive scanner 5. The scanning lines AZ1 are scanned by the first correcting scanner 71. The scanning lines AZ2 are scanned by the second correcting scanner 72. The write scanner 4, the drive scanner 5, the first correcting scanner 71, and the second correcting so scanner 72 jointly make up a scanning unit for successively scanning rows of pixels in each horizontal period. When each of the pixel circuits 2 is selected by one of the scanning lines WS, it samples a video signal from the corresponding signal line SL. When each of the pixel circuits 2 is selected by one of the scanning lines DS, it energizes a light-emitting device EL incorporated in the pixel circuit 2 depending on the sampled video signal. In addition, when each of the pixel circuits 2 is selected by one of the scanning lines AZ1, AZ2, it performs a predetermined correcting process.

The pixel circuit 2 shown in FIG. 2 includes five thin-film transistors Tr1 through Tr4, Trd, two capacitors Cs, Csub, and a light-emitting device EL. The capacitor Cs is a pixel capacitance, and the capacitor Csub is an additional capacitance provided according to an embodiment of the present invention. For a better understanding of the present invention, the capacitor of the light-emitting device EL is illustrated as a capacitor Coled. Each of the transistors Tr1 through Tr3, Trd includes an N-channel polysilicon TFT, and the transistor Tr4 includes a P-channel polysilicon TFT. As described above, the capacitor Cs is the pixel capacitance of the pixel circuit 2. The light-emitting device EL includes a diode-type organic EL device having an anode and a cathode, for example. According to an embodiment of the present invention, however, the light-emitting device EL is not limited to the diode-type organic EL device, but may generally be any of the current-driven devices capable of emitting light.

The transistor Trd, which is a drive transistor that plays a main role in the pixel circuit 2, has a gate G connected to a terminal of the pixel capacitance Cs and a source S connected to the other terminal of the pixel capacitance Cs. The gate G of the drive transistor Trd is also connected to a reference potential Vss1 through the transistor Tr2, which serves as a switching transistor. The drain of the drive transistor Trd is connected to a power supply potential Vcc through the transistor Tr4, which serves as a switching transistor. The switching transistor Tr2 has a gate connected to the scanning line AZ1. The switching transistor Tr4 has a gate connected to the scanning line DS. The light-emitting device EL has an anode connected to the source S of the drive transistor Trd and a cathode connected to ground, whose ground potential is represented by Vcath. The transistor Tr3, which serves as a switching transistor, is connected between the source S of the drive transistor Trd and a predetermined reference potential Vss2. The switching transistor Tr3 has a gate connected to the scanning line AZ2. The transistor Tr1, which serves as a sampling transistor, is connected between the signal line SL and the gate G of the drive transistor Trd. The sampling transistor Tr1 has a gate connected to the scanning line WS. The additional capacitance Csub has a terminal connected to the anode of the light-emitting device EL and the other terminal connected to ground. According to the present embodiment, the additional capacitance Csub is connected parallelly to the capacitor Coled of the light-emitting device EL.

In response to a control signal WS supplied from the scanning line WS, the sampling transistor Tr1 is turned on and samples a video signal Vsig supplied from the signal line SL into the pixel capacitance Cs. Depending on the sampled video signal Vsig, the pixel capacitance Cs applies an input voltage Vgs to the gate of the drive transistor Trd. The drive transistor Trd supplies an output current Ids depending on the input voltage Vgs to the light-emitting device EL. The output current (drain current) Ids is dependent on the carrier mobility μ in the channel region of the drive transistor Trd. The output current Ids supplied from the drive transistor Trd causes the light-emitting device EL to emit light at a luminance level depending on the video signal Vsig.

According to a feature of the present invention, the pixel circuit 2 has a correcting section made up of the switching transistors Tr1 through Tr4, for correcting the input voltage Vgs depending on the video signal Vsig sampled in the pixel capacitance Cs, in order to cancel out the dependency of the output current Ids on the carrier mobility μ. Specifically, the correcting section (Tr1 through Tr4) operates depending on control signals AZ1, AZ2 supplied from the scanning lines AZ1, AZ2 to extract the output current Ids from the drive transistor Trd and introduce the output current Ids into the capacitance Coled of the light-emitting device EL and the pixel capacitance Cs, thereby correcting the input voltage Vgs. Since the pixel circuit 2 has the additional capacitance Csub added to the capacitance Coled of the light-emitting device EL, part of the output current Ids from the drive transistor Trd flows into the additional capacitance Csub, thus giving a time margin to the operation of the correcting section (Tr1 through Tr4). While the video signal Vsig is being sampled in the pixel capacitance Cs, the correcting section (Tr1 through Tr4) extracts the output current Ids from the drive transistor Trd and supplies the output current Ids back to the pixel capacitance Cs through a negative feedback loop, thereby correcting the input voltage Vgs.

According to the present embodiment, the output current Ids of the drive transistor Trd is dependent on the threshold voltage Vth as well as the carrier mobility μ in the carrier region. In order to cancel out the dependency of the output current Ids on the carrier mobility μ, the correcting section (Tr2 through Tr4) detects the threshold voltage Vth of the drive transistor Trd in advance and adds the detected threshold voltage Vth to the input voltage Vgs.

Figure 3B:
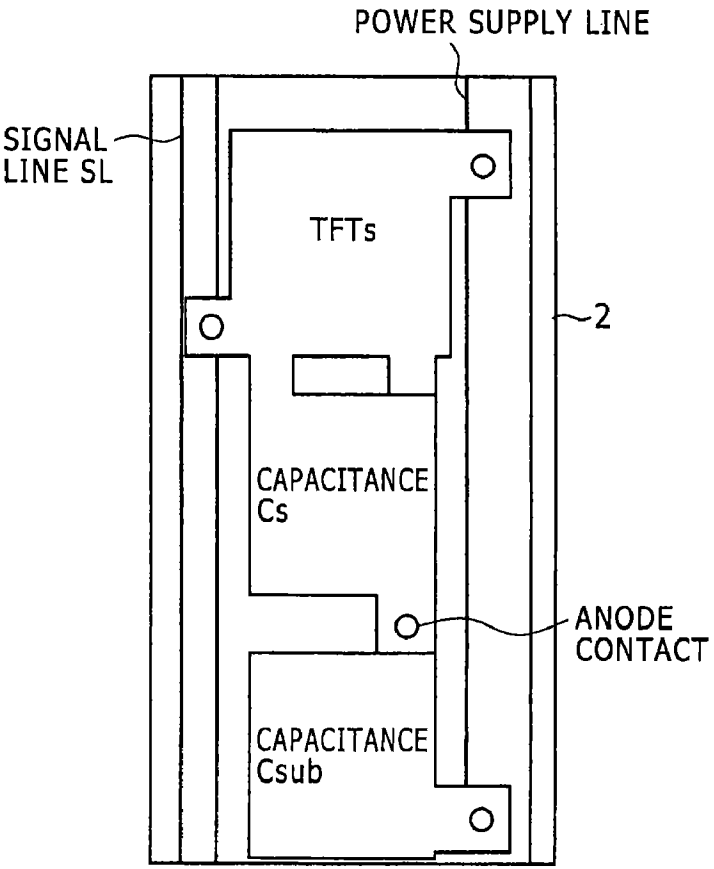
FIGS. 3A and 3B are plan views showing pixels of the display apparatus according to the first embodiment.
Figure 3A:
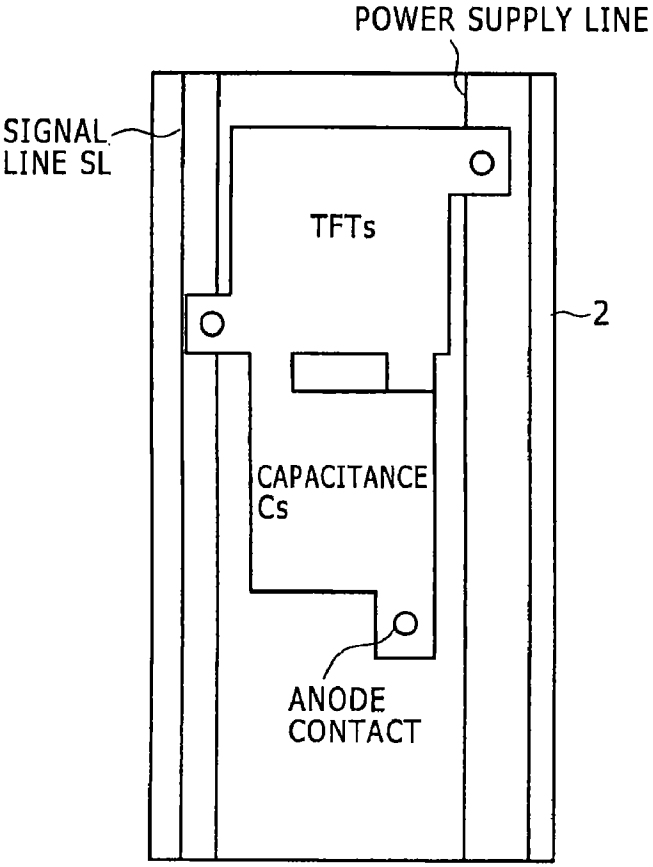

FIGS. 3A and 3B show in plan views layouts of the thin-film transistors TFTs, the pixel capacitance Cs, and the additional capacitance Csub of each of the pixel circuits 2. FIG. 3A shows the layout that is free of the additional capacitance Csub, and FIG. 3B shows the layout that includes the additional capacitance Csub according to an embodiment of the present invention. The sampling transistor Tr1, the drive transistor Trd, and the correcting section (Tr2 through Tr4) include the thin-film transistors TFTs formed on the insulating substrate, and the pixel capacitance Cs and the additional capacitance Csub include thin-film capacitors also formed on the insulating substrate. In the illustrated layout, the additional capacitance Csub has a terminal connected to the pixel capacitance Cs through an anode contact and the other terminal connected to a given fixed potential. The fixed potential is selected from the ground potential Vcath on the cathode of the light-emitting device EL or the positive power supply potential Vcc or negative power supply potential Vss of the pixel circuit 2. In the embodiment shown in FIG. 2, the other terminal of the additional capacitance Csub is connected to the ground potential. The pixel circuit 2 shown in FIG. 3B is a laminated structure including a lower layer which contains the thin-film transistors TFTs, the pixel capacitance Cs, and the additional capacitance Csub and an upper layer connected to the light-emitting device EL. For an easier understanding of the present invention, the light-emitting device EL is omitted from illustration in FIGS. 3A and 3B. Actually, the light-emitting device EL is connected to the pixel circuit 2 through an anode contact.

Figure 4:
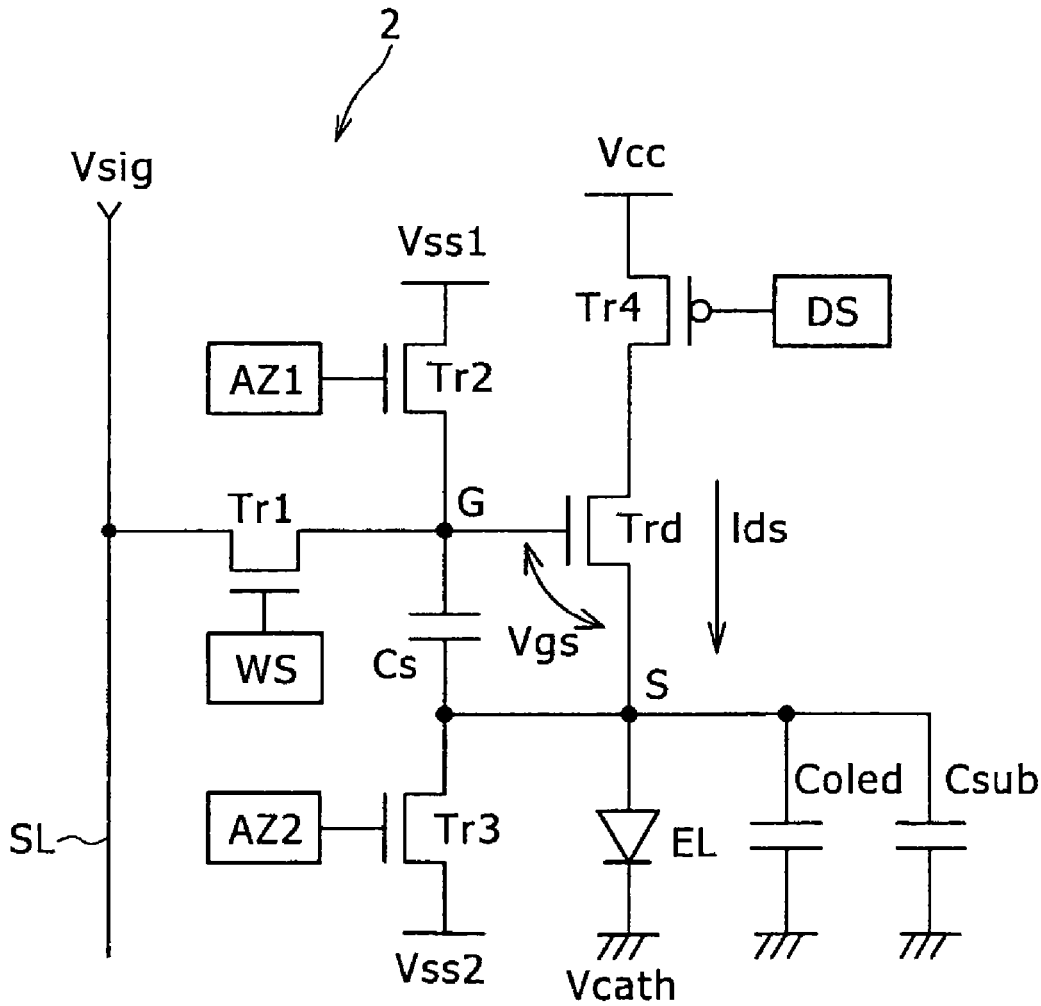
FIG. 4 is a circuit diagram of a pixel circuit of the display apparatus shown in FIG. 2.

FIG. 4 shows the pixel circuit 2 of the display apparatus shown in FIG. 2. FIG. 4 also shows the video signal Vsig sampled by the sampling transistor Tr1, the input voltage Vgs and output current Ids of the drive transistor Trd, the capacitor Coled of the light-emitting device EL, and the additional capacitance Csub for an easier understanding of the present invention.

Figure 5:
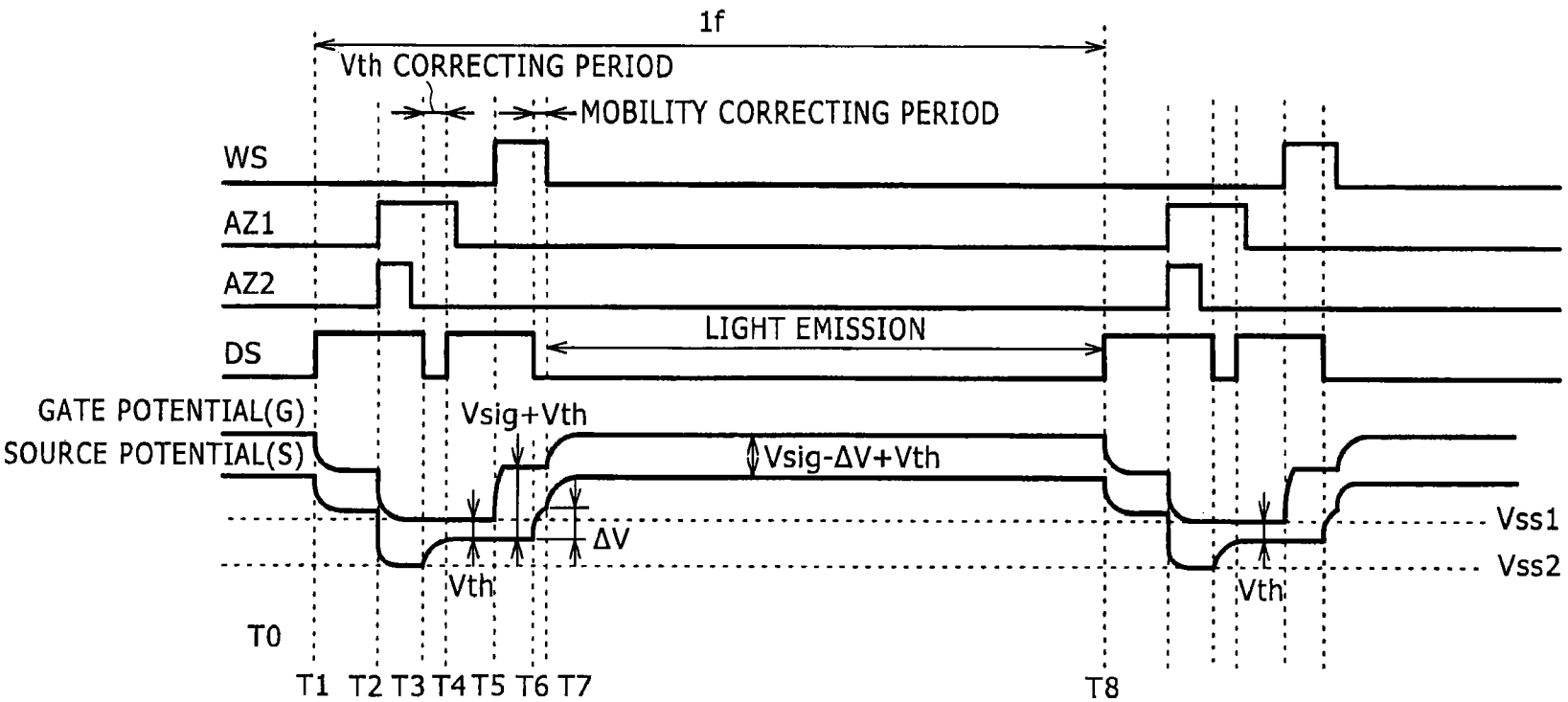
FIG. 5 is a timing chart illustrative of the operation of the pixel circuit shown in FIG. 4.

FIG. 5 is a timing chart illustrative of the operation of the pixel circuit shown in FIG. 4. the operation of the pixel circuit shown in FIG. 4 will be described in specific detail below with reference to FIG. 5. FIG. 5 shows the waveforms of control signals that are applied to the scanning lines WS, AZ1, AZ2, DS as the waveforms change along a time axis T. For the sake of brevity, the control signals are denoted by reference characters which are identical to the reference characters of the corresponding scanning lines. Since the transistors Tr1, Tr2, Tr3 are N-channel transistors, they are turned on when the scanning lines WS, AZ1, AZ2 are high in level, and turned off when the scanning lines WS, AZ1, AZ2 are low in level. On the other hand, since the transistor Tr4 is a P-channel transistor, it is turned off when the scanning lines WS, AZ1, AZ2 are high in level, and turned on when the scanning lines WS, AZ1, AZ2 are low in level. FIG. 5 also shows potential changes of the gate G and source S of the drive transistor Trd as well as the waveforms of the control signals WS, AZ1, AZ2, DS.

FIG. 5 shows one field (1f) from times T1 to T8. The rows of the pixel array are successively scanned once during one field. FIG. 5 shows the waveforms of the control signals WS, AZ1, AZ2, DS which are applied to the pixels of one row.

At time T0 prior to the field (1f), all the control signals WS, AZ1, AZ2, DS are low in level. Therefore, the N-channel transistors Tr1, Tr2, Tr3 are turned off, and only the P-channel transistor Tr4 is turned on. Since the drive transistor Trd is connected to the power supply potential Vcc through the transistor Tr4, the drive transistor Trd supplies the output current Ids depending on the input voltage Vgs to the light-emitting device EL. Accordingly, the light-emitting device EL emits light at time T0. At this time, the input voltage Vgs that is applied to the drive transistor Trd is represented by the difference between the gate potential (G) and the source potential (S).

At time T1 when the field (1f) begins, the control signal DS goes high, turning off the transistor Tr4. The drive transistor Trd is disconnected from the power supply potential Vcc, whereupon the light-emitting device EL stops emitting light, i.e., enters a non-emission period. At time T1, therefore, all the transistors Tr1 through Tr4 are turned off.

At time T2, the control signals AZ1, AZ2 go high, turning on the switching transistors Tr2, Tr3. As a result, the gate G of the drive transistor Trd is connected to the reference potential Vss1 and the source S thereof to the reference potential Vss2. By satisfying Vss1−Vss2>Vth and Vss1−Vss2=Vgs>Vth, the pixel circuit is prepared to correct the threshold voltage Vth at time T3. Stated otherwise, period T2 to T3 corresponds to a reset period of the drive transistor Trd. If the threshold voltage of the light-emitting device EL is represented by VthEL, then VthEL>Vss2 is satisfied. Therefore, a negative bias is applied to the light-emitting device EL, thereby reversely biasing the light-emitting device EL. The reversely biased state of the light-emitting device EL is requisite to properly correcting the threshold voltage Vth and correcting the mobility subsequently.

At time T3, the control signal AZ2 is made low in level, and immediately thereafter the control signal DS is also made low in level. The transistor Tr3 is turned off, and the transistor Tr4 is turned on. As a result, the drain current Ids flows into the pixel capacitance Cs to start correcting the threshold voltage Vth. At this time, the gate G of the drive transistor Trd is held at the reference potential Vss1, and the drain current Ids keeps flowing until the drive transistor Trd is cut off. When the drive transistor Trd is cut off, the source potential (S) of the drive transistor Trd becomes equal to Vss1−Vth. At time T4 after the drain current Ids is cut off, the control signal DS goes high again, turning off the switching transistor Tr4. The control signal AZ1 then goes low, turning off the switching transistor Tr2. As a consequence, the threshold voltage Vth is held in the pixel capacitance Cs. The period from time T3 to time T4 is thus a period for detecting the threshold voltage Vth of the drive transistor Trd. The period from time T3 to time T4 is referred to as a Vth correcting period.

After the threshold voltage Vth is corrected, the control signal WS goes high at time T5, turning on the sampling transistor Tr1 to write the video signal Vsig into the pixel capacitance Cs. The pixel capacitance Cs is sufficiently smaller than the equivalent capacitance Coled of the light-emitting device EL. As a result, most of the video signal Vsig is written into the pixel capacitance Cs. Precisely, the difference Vsig−Vss1 between the video signal Vsig and the reference potential Vss1 is written into the pixel capacitance Cs. Therefore, the voltage Vgs between the gate G and source S of the drive transistor Trd reaches a level (Vsig−Vss1+Vth), which is the sum of the previously detected and held threshold voltage Vth and the presently sampled difference Vsig−Vss1. For the sake of brevity, if it is assumed that Vss1=0 V then the gate-to-source voltage Vgs has a level Vsig+Vth as indicated by the timing chart shown in FIG. 5. The video signal Vsig is sampled until T7 when the control signal WS goes low again. The period from time T5 to time T7 corresponds to the sampling period.

At time T6 prior to time T7 when the sampling period is ended, the control signal DS goes low, turning on the switching transistor Tr4. Since the drive transistor Trd is connected to the power supply potential Vcc, the pixel circuit goes from the non-emission period to an emission period. In the period from time T6 to time T7 in which the sampling transistor Tr1 remains turned on and the switching transistor Tr4 is turned on, the mobility of the drive transistor Trd is corrected. Specifically, according to the present embodiment, the mobility is corrected in the period from time T6 to time T7 where a rear portion of the sampling period and a front portion of the emission period overlap each other. In the front portion of the emission period wherein the mobility is corrected, the light-emitting device EL does not emit light because it is actually reversely biased. In the mobility correcting period from time T6 to time T7, the gate G of the drive transistor Trd is fixed to the level of the video signal Vsig, and the drain current Ids flows through the drive transistor Trd. By setting Vss1−Vth<VthEL, the light-emitting device EL is reversely biased. Therefore, the light-emitting device EL does not exhibit diode characteristics, but simple capacitance characteristics. Consequently, the drain current Ids flowing through the drive transistor Trd is written into a capacitance C=Cs+Coled+Csub, which is the combination of the pixel capacitance Cs, the equivalent capacitance Coled of the light-emitting device EL, and the additional capacitance Csub. The source voltage (S) of the drive transistor Trd rises by an increase ΔV, as shown in FIG. 5. The increase ΔV is subtracted from the gate-to-source voltage Vgs that is held by the pixel capacitance Cs, and the drive transistor Trd is placed in a negative feedback loop. By thus supplying the output current Ids of the drain transistor Trd across the input voltage Vgs of the drain transistor Trd through the negative feedback loop, the mobility μ can be corrected. The negative feedback quantity ΔV can be optimized by adjusting the time duration of the mobility correcting period (T6 to T7).

At time T7, the control signal WS goes low, turning off the sampling transistor Tr1. The gate G of the drive transistor Trd is disconnected from the signal line SL. As the video signal Vsig is no longer applied, the gate potential (G) of the drive transistor Trd increases together with the source potential (S) thereof. While the gate potential (G) and the source potential (S) are rising, the gate-to-source voltage Vgs keeps the value (Vsig−ΔV+Vth). As the source potential (S) rises, the light-emitting device EL is no longer reversely biased. When the output current Ids flows into the light-emitting device EL, the light-emitting device EL actually starts emitting light. By substituting Vsig−ΔV+Vth in Vgs of the above transistor characteristic equation (1), the relationship between the drain current Ids and the gate voltage Vgs is given by the following equation (2):

$$Ids=k\mu(Vgs-Vth)^2=k\mu(Vsig-\Delta V)^2 \quad (2)$$

where k=(½) (W/L)Cox. It can be understood from the characteristic equation (2) that the term of Vth is canceled and the output current Ids supplied to the light-emitting device EL is not dependent on the threshold voltage Vth of the drive transistor Trd. Basically, the drain current Ids is determined by the signal voltage Vsig of the video signal. In other words, the light-emitting device EL emits light at a luminance level depending on the video signal Vsig. The video signal Vsig is corrected by the feedback quantity ΔV. The corrective quantity ΔV acts to cancel the effect of the mobility μ in the coefficient part of the characteristic equation (1). Therefore, the drain current Ids is essentially dependent on only the video signal Vsig.

Finally, at time T8, the control signal DS goes high, turning off the switching transistor Tr4. The light-emitting device EL stops emitting light, and the field (1f) is put to an end. Then, the Vth correcting process, the mobility correcting process, and the light-emitting process are repeated in the next field.

Figure 6:
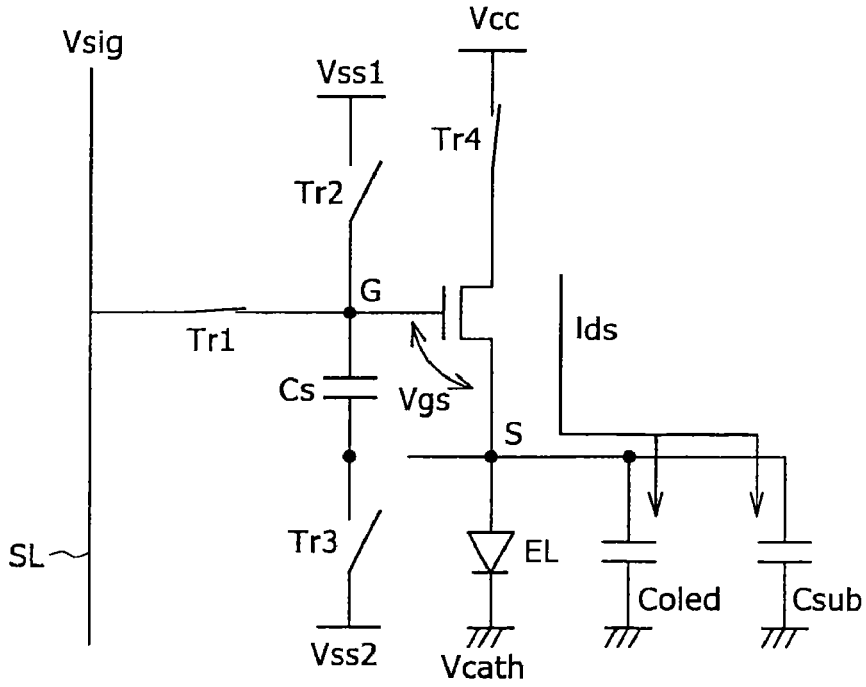
FIG. 6 is a circuit diagram illustrative of the operation of the pixel circuit shown in FIG. 4.

FIG. 6 is a circuit diagram of the pixel circuit 2 in the mobility correcting period T6 to T7. As shown in FIG. 6, in the mobility correcting period T6 to T7, the sampling transistor Tr1 and the switching transistor Tr4 are turned on, and the remaining transistors Tr2, Tr3 are turned off. At this time, the source potential (S) of the switching transistor Tr4 is represented by Vss1−Vth. The source potential (S) is also the anode potential of the light-emitting device EL. As described above, by setting Vss1−Vth<VthEL, the light-emitting device EL is reversely biased and exhibits simple capacitance characteristics, rather than diode characteristics. Consequently, the drain current Ids flowing through the drive transistor Trd flows into the combined capacitance C=Cs+Coled+Csub which is the combination of the pixel capacitance Cs, the equivalent capacitance Coled of the light-emitting device EL, and the additional capacitance Csub. Stated otherwise, part of the output current Ids flows into the pixel capacitance Cs through a negative feedback loop, thus correcting the mobility.

Figure 7:
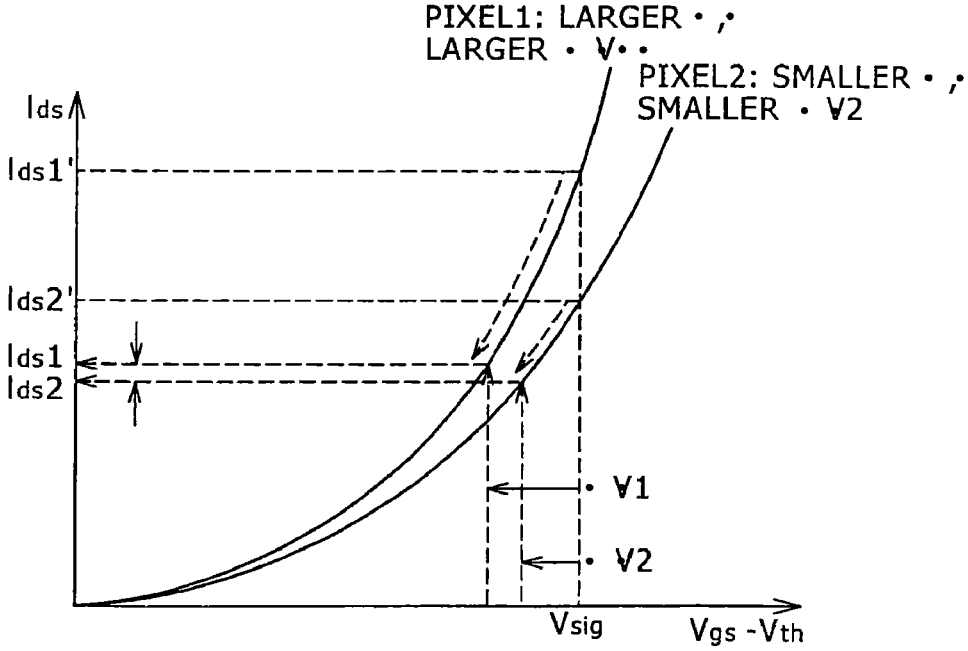
FIG. 7 is a graph illustrative of the operation of the pixel circuit shown in FIG. 4.

FIG. 7 is a graph illustrating the transistor characteristic equation (2). The vertical axis of the graph represents Ids and the horizontal axis represents Vsig. FIG. 7 also shows the transistor characteristic equation (2) below the graph. In FIG. 7, characteristic curves of pixels 1, 2 are plotted for comparison. The mobility μ of the drive transistor of the pixel 1 is relatively large. Conversely, the mobility μ of the drive transistor of the pixel 2 is relatively small. With the drive transistors including polysilicon thin-film transistors, the mobility μ inevitably varies from pixel to pixel. For example, when the video signal Vsig of the same level is written into the pixels 1, 2, if no mobility is corrected at all, then an output current Ids1' flowing through the pixel 1 having the larger mobility μ is greatly different from an output current Ids2' flowing through the pixel 2 having the smaller mobility μ. Since the output currents Ids of the pixels 1, 2 differ greatly from each other due to the different mobilities μ, the image uniformity over the screen is greatly impaired.

According to an embodiment of the present invention, mobility variations are canceled by supplying the output current across the input voltage through a negative feedback loop. As can be seen from the transistor characteristic equations, as the mobility is greater, the drain current Ids becomes larger. Therefore, the negative feedback quantity ΔV is larger as the mobility is greater. As shown in the graph of FIG. 7, the negative feedback quantity ΔV1 of the pixel 1 having the larger mobility μ is greater than the negative feedback quantity ΔV2 of the pixel 2 having the smaller mobility μ. Therefore, the negative feedback is greater as the mobility μ is larger, making it possible to suppress mobility variations. As shown in FIG. 7, if the mobility is corrected by ΔV1 for the pixel 1 having the larger mobility μ, then the output current largely drops from Ids1' to Ids1. On the other hand, since the corrective quantity ΔV2 for the pixel 2 having the smaller mobility μ is smaller, the drop of the output current from Ids2' to Ids2 is not so large. As a result, the output current Ids1 and the output current Ids2 are essentially equal to each other, canceling mobility variations. Because mobility variations are canceled in the full range of Vsig from a black level to a white level, the image uniformity over the screen becomes very high. The above mobility correction is summarized as follows: If there are pixels 1, 2 having different mobilities, then the corrective quantity ΔV1 for the pixel 1 having the larger mobility is smaller than the corrective quantity ΔV2 for the pixel 2 having the smaller mobility. In other words, as the mobility is larger, the corrective quantity ΔV is greater, and the reduction in the output current Ids is greater. Thus, currents flowing through pixels having different mobilities are made uniform, thereby correcting mobility variations.

Figure 8:
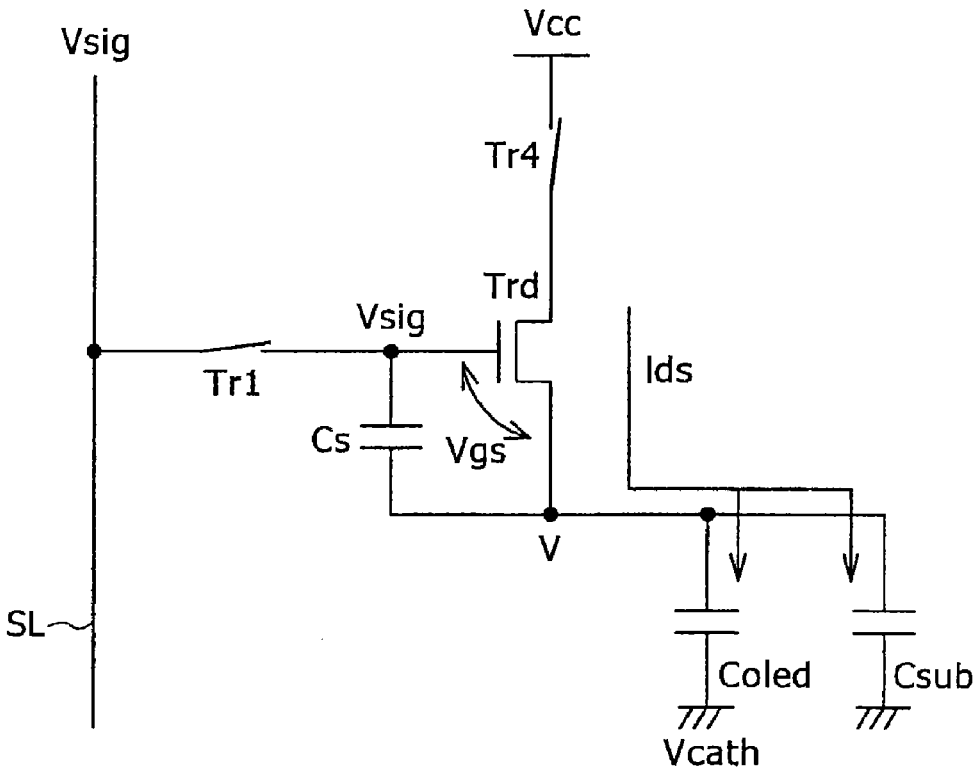
FIG. 8 is a circuit diagram illustrative of the operation of the pixel circuit shown in FIG. 4.

A numerical analysis of the above mobility correction will be described below with reference to FIG. 8. As shown in FIG. 8, while the transistors Tr1, Tr4 are being turned on, an analysis is performed using the source potential (S) of the drive transistor Trd as a variable V. If the source potential (S) of the drive transistor Trd is represented by V, then the drain current Ids flowing through the drive transistor Trd is expressed by the following equation (3):

$$I_{ds}=k\mu(V_{gs}-V_{th})^2=k\mu(V_{sig}-V-V_{th})^2 \tag{3}$$

Because of the relationship between the drain current Ids and the capacitance C (=Cs+Coled+Csub), the relationship Ids=dQ/dt=CdV/dt is satisfied as indicated by the following equation (4):

$$\text{From } I_{ds}=\frac{dQ}{dt}=C\frac{dV}{dt},\ \int\frac{1}{C}dt= \tag{4}$$

$$\int\frac{1}{I_{ds}}dV \Leftrightarrow \int_0^t\frac{1}{C}dt=\int_{-Vth}^{V}\frac{1}{k\mu(V_{sig}-V_{th}-V)^2}dV \Leftrightarrow \frac{k\mu}{C}t=$$

$$\left[\frac{1}{V_{sig}-V_{th}-V}\right]_{-Vth}^{V}=\frac{1}{V_{sig}-V_{th}-V}-\frac{1}{V_{sig}} \Leftrightarrow$$

$$V_{sig}-V_{th}-V=\frac{1}{\frac{1}{V_{sig}}+\frac{k\mu}{C}t}=\frac{V_{sig}}{1+V_{sig}\frac{k\mu}{C}t}$$

Then, the equation (3) is substituted in the equation (4), and both sides are integrated. The source voltage V has an initial state represented by −Vth, and the mobility variation correction time (T6 to T7) is represented by t. By solving the differential equation, the pixel current in the mobility variation correction time t is given by the following equation (5):

$$I_{ds}=k\mu\left(\frac{V_{sig}}{1+V_{sig}\frac{k\mu}{C}t}\right)^2 \tag{5}$$

Figure 9:
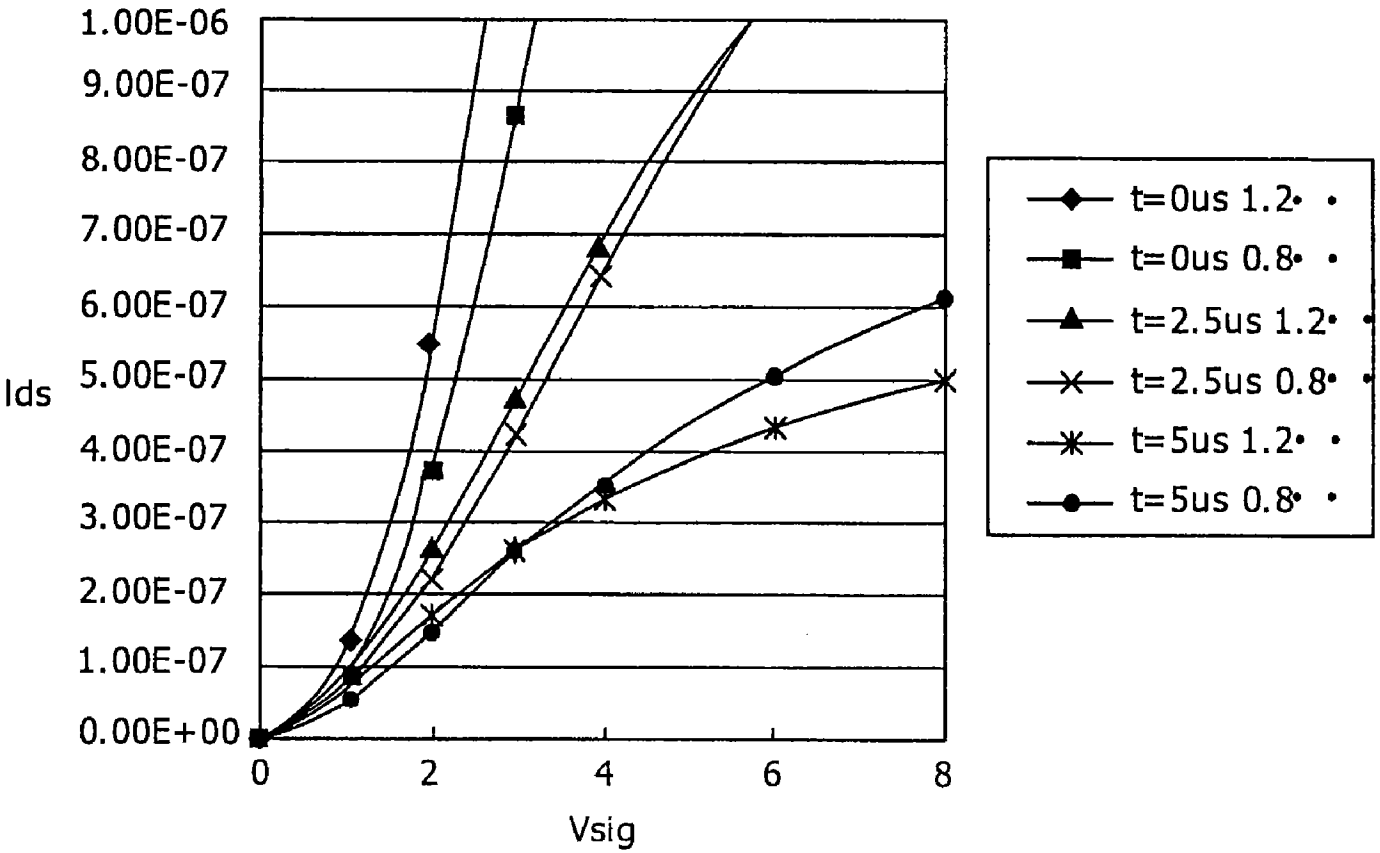
FIG. 9 is a graph showing operating characteristics of a drive transistor included in the pixel circuit shown in FIG. 4.

FIG. 9 shows a graphic representation of the equation (5). The vertical axis of the graph shown in FIG. 9 represents the output current Ids, and the horizontal axis represents the video signal Vsig. Parameters include mobility correcting periods [t=0 us, 2.5 us, and 5 us] *t=0 μs, 2.5 μs, and 5 μs* and also a relatively large mobility 1.2μ and a relatively small mobility 0.8 p. The capacitance C is represented by Cs+Coled only, with Csub being zero. It can be seen from FIG. 9 that the mobility variation is sufficiently corrected with t=2.5 [us] *μs* compared with t=0 [us] *μs* for essentially no mobility correction. While Ids varies by 40% with no mobility correction, Ids varies by 10% with mobility correction. However, if the correcting period is increased with t=5 [us] *μs*, then the output current Ids varies greatly due to different mobilities μ. Consequently, the correcting period t needs to be set to an appropriate value in order to perform appropriate mobility correction. In the graph shown in FIG. 9, the optimum correcting period t is in the vicinity of t=2.5 [us] *μs*. In view of the delay of the control signal (gate pulse) applied to the gate of the transistor, however, the correcting period t=2.5 [us] *μs* is not necessarily pertinent. Judging from the operating characteristics of the transistor, the correcting period t should be as long as possible. In the equation (5) described above, t is included as t/C. In order to increase t without affecting the right side of the equation (5), the value of C may be increased while keeping the value of t/C constant. According to an embodiment of the present invention, the additional capacitance Csub is introduced into the pixel circuit in addition to the pixel capacitance Cs and the light-emitting device capacitance Coled which make up the capacitance C. The additional capacitance Csub makes the total capacitance C greater and increases the correcting period t correspondingly, so that it is possible to increase the time margin of operation of the correcting section which is included in the pixel circuit.

In the mobility correcting period, as described above and as shown in the timing chart of FIG. 5, while the gate potential is being fixed, the output current Ids is caused to flow through the drive transistor Trd, writing electric charges into the pixel capacitance Cs and the light-emitting device capacitance Coled. The value of the output current Ids is as indicated by the equation (5). As the equation (5) does not contain a term of Vth, the mobility can be corrected without being affected by Vth. Specifically, since the mobility μ is included in a term in the denominator on the right side of the equation (5), as the mobility μ is larger, the output current Ids is smaller, and as the mobility μ is smaller, the output current Ids is larger, thereby correcting mobility variations.

The mobility correcting term of the equation (5) includes t/C, where t represents the mobility correcting period and C represents the combined capacitance of the pixel capacitance Cs, the light-emitting device capacitance Coled, etc. The relationship between different mobility correcting periods t and output current variations is shown in the graph of FIG. 9. As described above, it is known that the correcting capability is not sufficient if the mobility correcting period t is too short or too long. In the graph shown in FIG. 9, the mobility correcting period t=2.5 [us] *μs* is an essentially optimum level. However, in view of the delay in the gate pulse, the mobility correcting period t=2.5 [us] *μs* may often be too short. It is practically difficult to control the mobility correcting period t accurately.

According to an embodiment of the present invention, the capacitance C used to correct the mobility is increased for making the mobility correction easy. The capacitance C may be increased by increasing the light-emitting device capacitance Coled or the pixel capacitance Cs or adding the additional capacitance Csub. The light-emitting device capacitance Coled is determined by the pixel size, the pixel aperture ratio, and the basic properties of the organic EL material of the light-emitting device, and hence it is difficult to increase simply. Increasing the pixel capacitance Cs results in an increase in the anode potential at the time the signal voltage is written. Specifically, the increase in the anode potential is determined by Cs/(Cs+Coled)×ΔV. Therefore, the input signal voltage gain represented by Coled/(Cs+Coled) is lowered. In order to make up for the reduction in the input signal voltage gain, the amplitude level of the video signal has to be increased, putting a burden on the driver accordingly. According to an embodiment of the present invention, in order to increase the capacitance C, the additional capacitance Csub is formed on the insulating substrate on which TFTs are integrated, and connected parallel to the light-emitting device capacitance Coled. In this manner, while increasing the input gain (Coled+Csub)/(Cs+Coled+Csub), the value of the total capacitance C can be increased, and the optimum mobility correcting period t can be set to a long value, making it possible to increase the margin for setting the mobility correcting period. In the pixel circuit according to the first embodiment, the drive transistor Trd is of the N-channel type and the other switching transistors are of both the N-channel type and the P-channel type. However, the transistors may be of either the N-channel type or the P-channel type.

Figure 10:
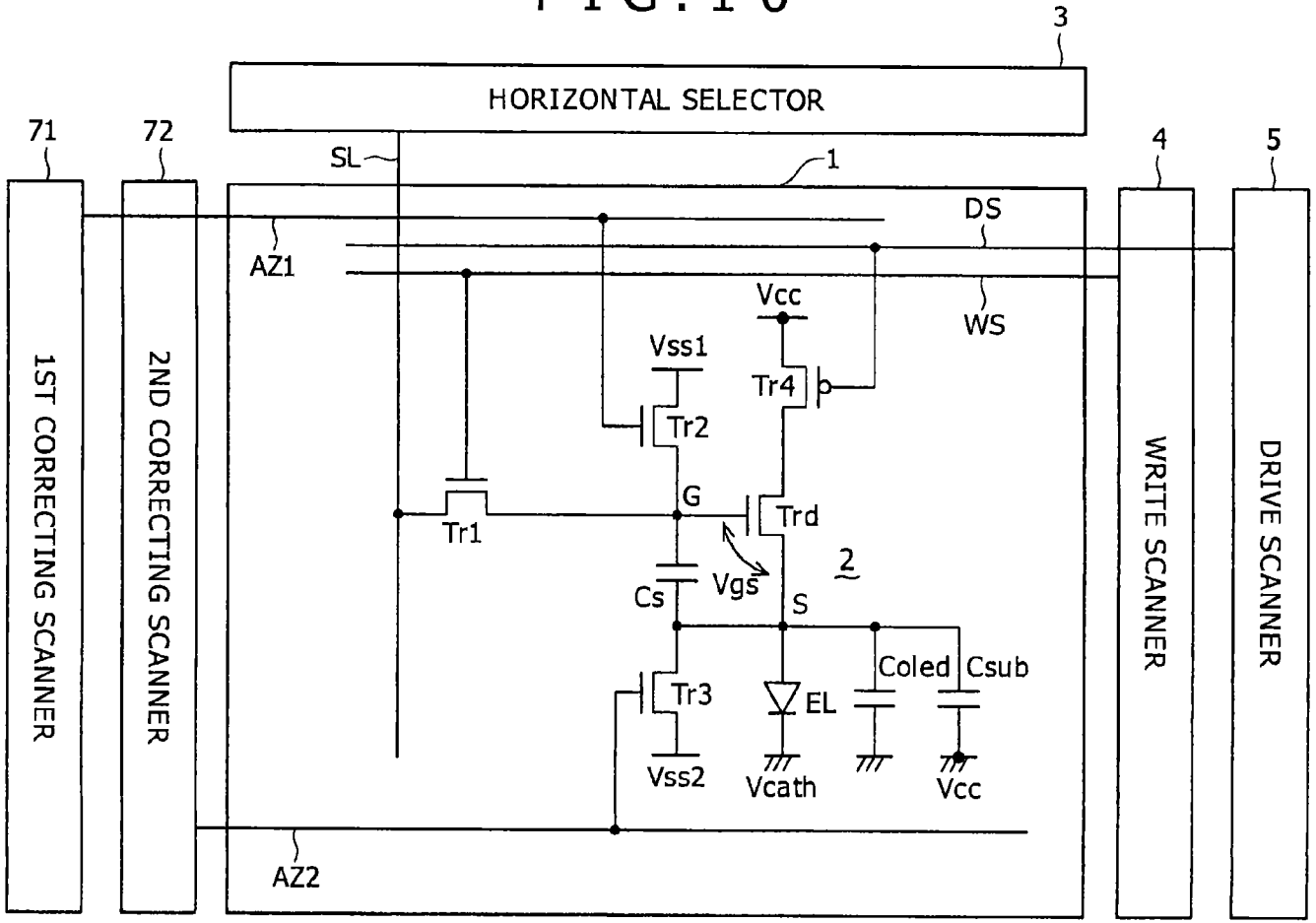
FIG. 10 is a circuit diagram, partly in block form, of a modification of the display apparatus according to the first embodiment shown in FIG. 2.

FIG. 10 is a circuit diagram, partly in block form, of a modification of the display apparatus according to the first embodiment shown in FIG. 2. In the first embodiment, one of the terminals of the additional capacitance Csub is connected to the anode of the light-emitting device EL, and the other terminal is connected to the ground potential Vcath on the cathode of the light-emitting device EL. According to the present modification, the other terminal of the additional capacitance Csub is connected to the power supply potential Vcc. According to an embodiment of the present invention, the other terminal of the additional capacitance Csub may be connected to a fixed potential. The fixed potential may be selected from the ground potential Vcath on the cathode of the light-emitting device EL, or the positive power supply potential Vcc or negative power supply potential of the pixel circuit 2. In some cases, the additional capacitance Csub may be connected parallelly to the pixel capacitance Cs to increase the total capacitance Cs. However, since connecting the additional capacitance Csub parallelly to the pixel capacitance Cs would reduce the gain of the input signal, it is not desirable to connect the additional capacitance Csub parallelly to the pixel capacitance Cs.

Figure 11:
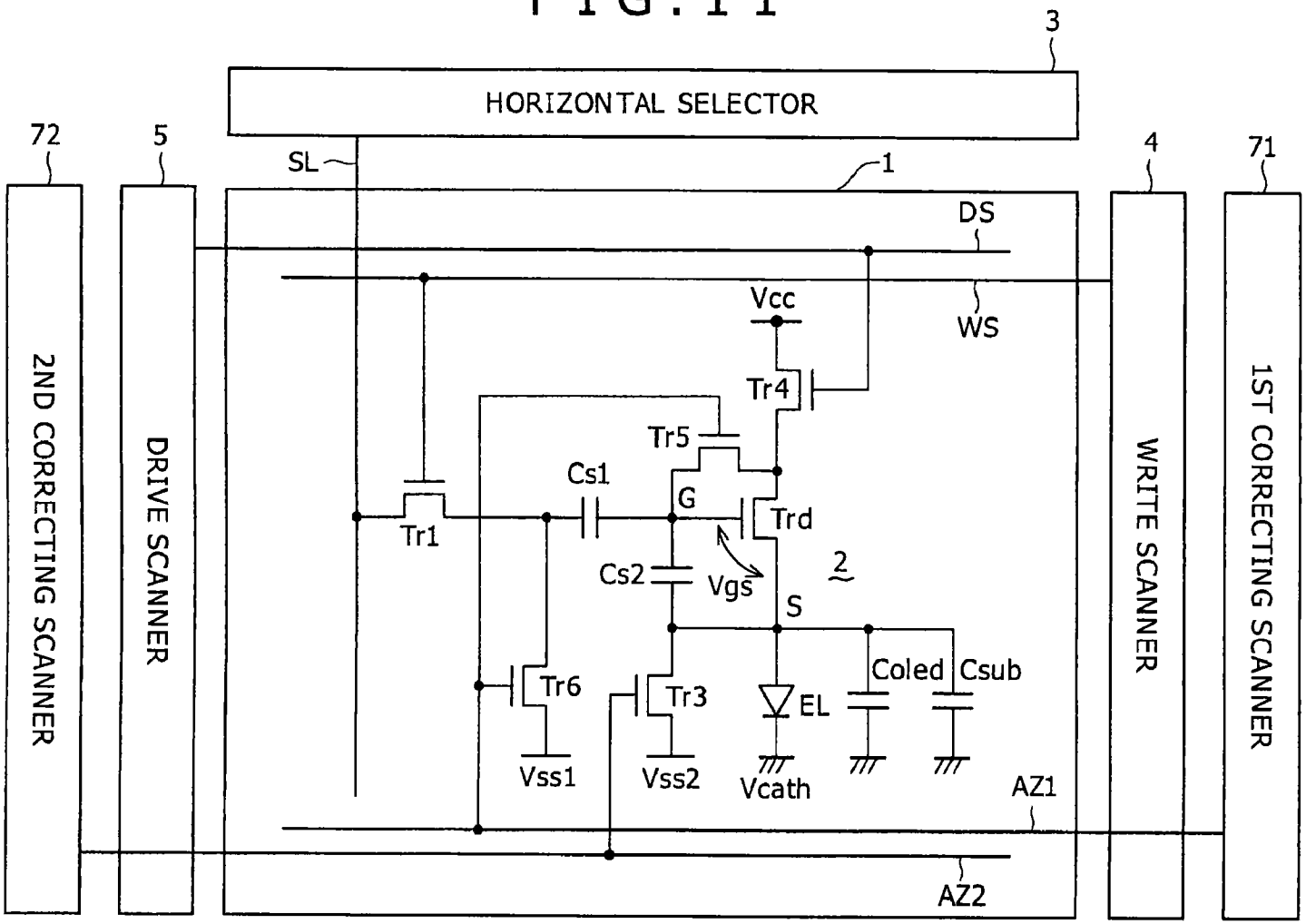
FIG. 11 is a circuit diagram, partly in block form, of a display apparatus according to a second embodiment of the present invention.

FIG. 11 is a circuit diagram, partly in block form, of a display apparatus according to a second embodiment of the present invention. For an easier understanding of the second embodiment, those parts of the display apparatus according to the second embodiment which correspond to those of the display apparatus according to the first embodiment shown in FIG. 2 are denoted by corresponding reference characters. As shown in FIG. 11, the display apparatus according to the second embodiment has a pixel array 1 and surrounding circuits. The surrounding circuits include a horizontal selector 3, a write scanner 4, a dive scanner 5, a first correcting scanner 71, and a second correcting scanner 72. The pixel array 1 includes a matrix of pixel circuits 2. For an easier understanding of the second embodiment, only one pixel circuit 2 is shown at an enlarged scale. The pixel circuit 2 includes six transistors Tr1, Trd, Tr3 through Tr6, three capacitors Cs1, Cs2, Csub, and a light-emitting device EL. All of the transistors are of the N-channel type. The drive transistor Trd, which plays the main role in the pixel circuit 2, has a gate G connected to terminals of the capacitors Cs1, Cs2. The capacitor Cs1 serves as a coupling capacitor interconnecting the input and output sides of the pixel circuit 2. The capacitor Cs2 serves as a pixel capacitance into which a video signal is written through the coupling capacitor Cs1. The drive transistor Trd has a source S connected to the other terminal of the pixel capacitance Cs2, and also to the light-emitting device EL. The light-emitting device EL includes a diode-type device having an anode connected to the source S of the drive transistor Trd and a cathode K to the ground potential Vcath. The capacitor Csub is an additional capacitance according to an embodiment of the present invention and is connected between the source S of the drive transistor Trd and the ground potential Vcath. The switching transistor Tr3 is connected between the source S of the drive transistor Trd and the predetermined reference potential Vss2. The switching transistor Tr3 has a gate connected to the scanning line AZ2. The drain of the drive transistor Trd is connected to the power supply Vcc through the switching transistor Tr4. The switching transistor Tr4 has a gate connected to the scanning line DS. In addition, the switching transistor Tr5 is interposed between the gate G and drain of the drive transistor Trd. The switching transistor Tr5 has a gate connected to the scanning line AZ1. The sampling transistor Tr1 on the input side is connected between the signal line SL and the other terminal of the coupling capacitance Cs1. The sampling transistor Tr1 has a gate connected to the scanning line WS. The transistor Tr6 is interposed between the other terminal of the coupling capacitance Cs1 and the predetermined reference potential Vss1. The transistor Tr6 has a gate connected to the scanning line AZ1.

Figure 12:
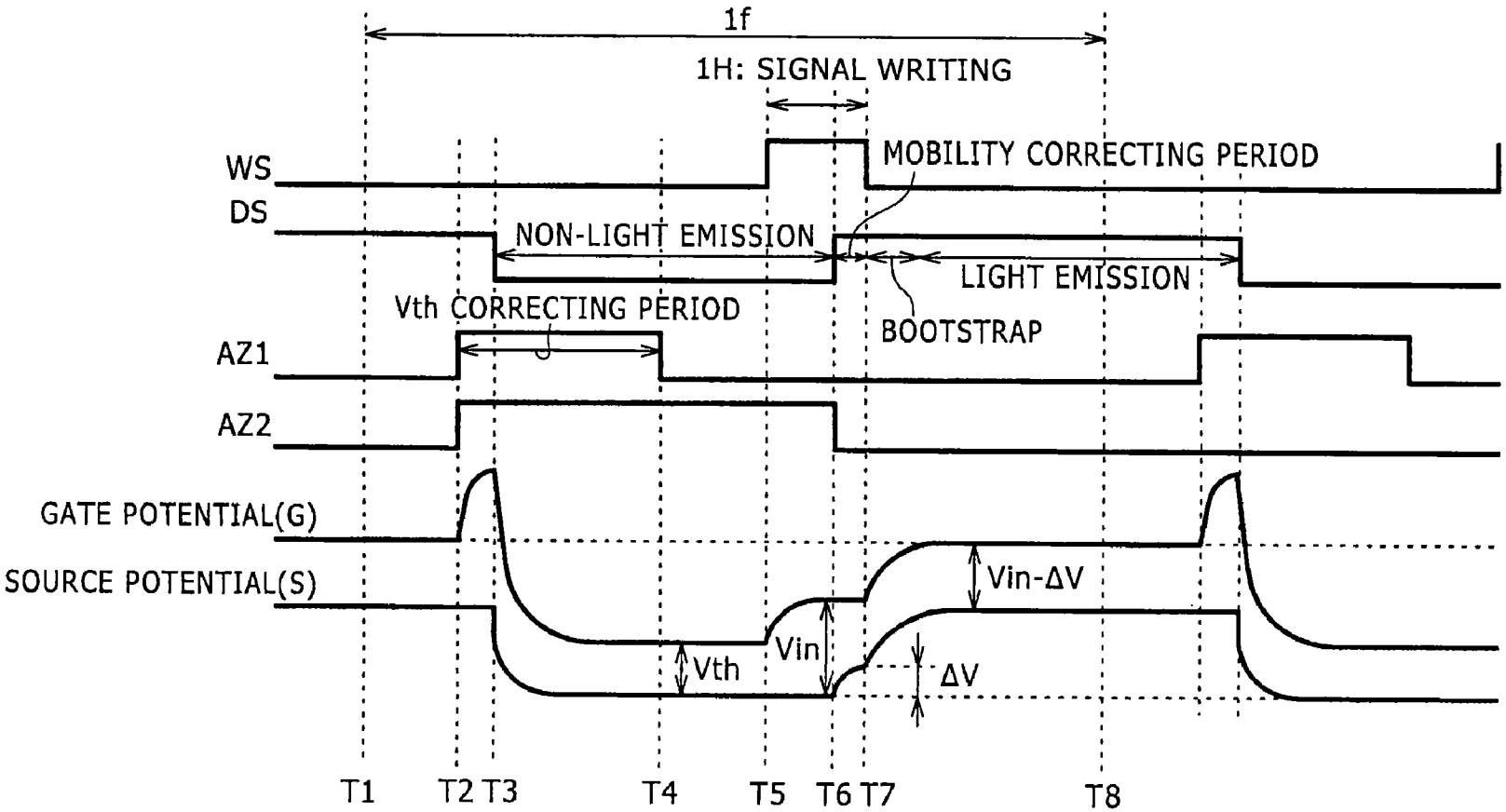
FIG. 12 is a timing chart illustrative of the operation of a pixel circuit included in the display apparatus shown in FIG. 11.

FIG. 12 is a timing chart illustrative of the operation of the pixel circuit shown in FIG. 11. FIG. 11 shows the waveforms of control signals WS, DS, AZ1, AZ2 as the waveforms change along the time axis T, and also shows changes of the gate potential (G) and the source potential (S) of the drive transistor Trd. At time T1 when the field (1f) starts, the control signals WS, AZ1, AZ2 are low in level, and only the control signal DS is high in level. At time T1, therefore, only the switching transistor Tr4 is turned on, and the remaining transistors Tr1, Tr3, Tr5, Tr6 are turned off. At this time, since the drive transistor Trd is connected to the power supply Vcc through the energized switching transistor Tr4, a predetermined drain current Ids flows into the light-emitting device EL, which emits light.

At time T2, the control signals AZ1, AZ2 go high, turning on the transistors Tr5, Tr6. As the gate G of the drive transistor Trd is connected to the power supply Vcc through the energized transistor Tr5, the gate potential (G) increases sharply.

At subsequent time T3, the control signal DS goes low in level, turning off the transistor Tr4. Since the current from the power supply to the drive transistor Trd is not cut off, the drain current Ids is reduced. The source potential (S) and the gate potential (G) are lowered. No drain current flows when the potential difference between the source potential (S) and the gate potential (G) reaches the threshold voltage Vth. At this time, the threshold voltage Vth is held in the pixel capacitance Cs2. The threshold voltage Vth held in the pixel capacitance Cs2 is used to cancel the threshold voltage of the drive transistor Trd. Since the switching transistor Tr3 has been turned on, the source S of the drive transistor Trd is connected to the reference potential Vss2 through the switching transistor Tr3. The reference potential Vss2 is set to a level lower than the threshold voltage of the light-emitting device EL, holding the light-emitting device EL reversely biased.

Subsequently, at time T4, the control signal AZ1 goes low in level, turning off the transistors Tr5, Tr6, and fixing the threshold voltage Vth written in the pixel capacitance Cs2. A period from time T2 to time t4 is referred to as a Vth correcting period (T2 to T4). Since the transistor Tr6 is turned on in the Vth correcting period (T2 to T4), the other terminal of the coupling capacitance Cs1 is held at the reference potential Vss1.

At time T5, the control signals WS, AZ2 go high in level, turning on the sampling transistor Tr1. As a result, the gate G of the drive transistor Trd is connected to the signal line SL through the coupling capacitance Cs1 and the energized sampling transistor Tr1. As a result, the video signal is coupled to the gate G of the drive transistor Trd through the coupling capacitance Cs1, increasing the potential of the gate G. In the timing chart shown in FIG. 13, the voltage representative of the sum of the coupled video signal and the threshold voltage Vth is indicated by Vin. The voltage Vin is held in the pixel capacitance Cs2. Thereafter, at time T7, the control signals WS goes low in level, holding the written potential in the pixel capacitance Cs2. The period in which the video signal is written into the pixel capacitance Cs2 through the coupling capacitance Cs1 is referred to as a sampling period (T5 to T7). The sampling period (T5 to T7) usually corresponds to one horizontal period (1H).

According to the present embodiment, at time T6 prior to time T7 when the sampling period is finished, the control signal DS goes high and the control signal AZ2 goes low. As a result, the source S of the drive transistor Trd is disconnected from the reference potential Vss2, and a current flows from the drain thereof to the source S thereof. Since the sampling transistor Tr1 remains turned on, the gate potential (G) of the drive transistor Trd is kept as the video potential. As the output current flows through the drive transistor Trd, it charges the pixel capacitance Cs2 and the equivalent capacitance of the reversely biased light-emitting device EL. The source potential (S) of the drive transistor Trd is increased by ΔV, and the voltage Vin held in the pixel capacitance Cs2 is reduced accordingly. In other words, the output current from the source (S) is supplied across the input voltage at the gate G through a negative feedback loop during the period T6 to T7. The negative feedback quantity is indicated by ΔV. The mobility of the drive transistor Trd is corrected by the above negative feedback operation.

At subsequent time T7, the control signal WS goes low. When the video signal is no longer applied, a so-called bootstrap process is performed to increase the gate potential (G) and the source potential (S) while keeping the difference (Vin−ΔV) therebetween. As the source potential (S) rises, the reversely biased state of the light-emitting device EL is canceled, allowing the output current Ids to flow into the light-emitting device EL, which then emits light at a luminance level depending on the video . Thereafter, at time T8, the field (1f) is ended, and the operation goes on to the field. In the next field, the threshold voltage Vth is corrected, the signal is written, and the mobility is corrected.

Figure 13:
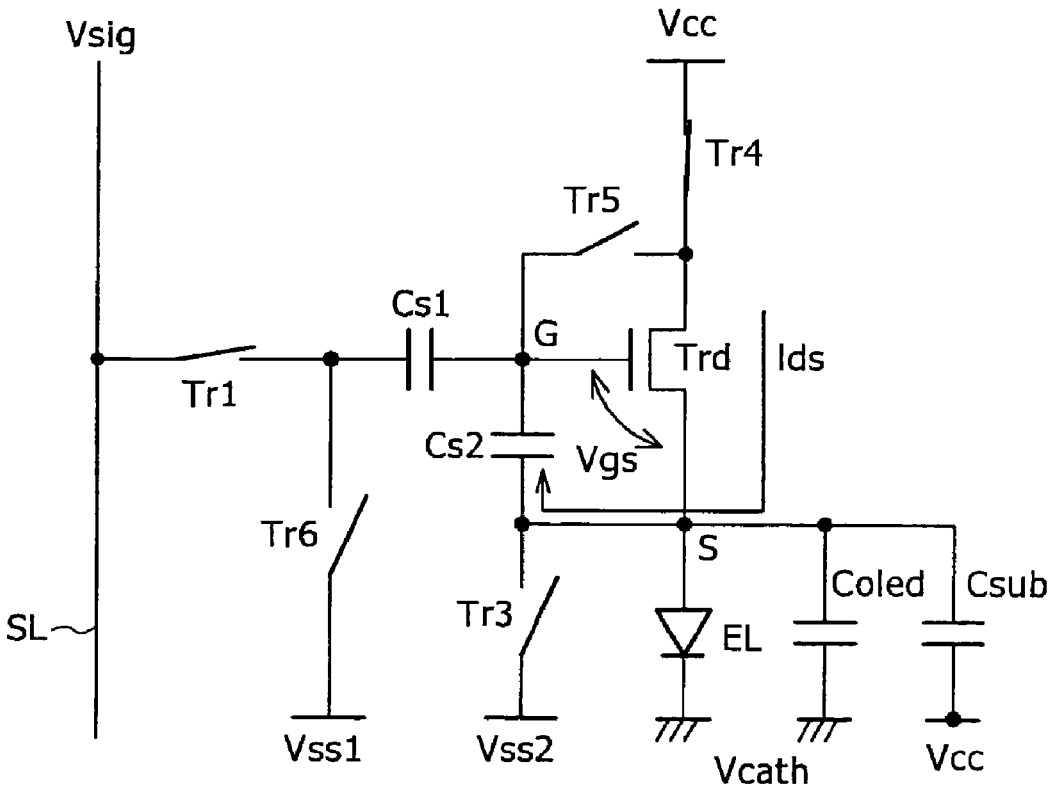
FIG. 13 is a circuit diagram illustrative of the operation of the pixel circuit included in the display apparatus shown in FIG. 11.

FIG. 13 is a circuit diagram of the pixel circuit 2 in the mobility correcting period (T6 to T7) shown in FIG. 12. The pixel circuit 2 has a correcting section including the switching transistors Tr3, Tr4, Tr5. The correcting section corrects the input voltage Vin (Vgs) that is held in the pixel capacitance Cs2 prior to or at a beginning end of the light-emission period (T6 to T8) in order to cancel the dependency of the output current Ids on the carrier mobility-p. The correcting section operates in a portion of the sampling period (T5 to T7) depending on the control signals WS, DS that are supplied respectively from the scanning lines WS, DS, to extract the output current Ids from the drive transistor Trd while the video signal Vsig is being sampled, and supply the output current Ids to the pixel capacitance Cs2 through the negative feedback loop to correct the input voltage Vgs. In addition, in order to cancel the dependency of the output current Ids on the threshold voltage Vth, the correcting section (Tr3, Tr4, Tr5) detects the threshold voltage Vth of the drive transistor Trd in the period T2 to T4 prior to the sampling period (T5 to T7) and adds the detected threshold voltage Vth to the input voltage Vgs.

In the present embodiment, the drive transistor Trd is also an N-channel transistor and has the drain connected to the power supply Vcc and the source S connected to the light-emitting device EL. With this arrangement, the correcting section extracts the output current Ids from the drive transistor Trd in the beginning portion (T6 to T7) of the light-emitting period (T6 to T8) which overlaps a rear portion of the sampling period (T5 to T7), and supplies the output current Ids to the pixel capacitance Cs2 through the negative feedback loop. At this time, the correcting section causes the output current Ids extracted from the source S of the drive transistor Trd to flow into the equivalent capacitance Coled of the light-emitting device EL and the additional capacitance Csub during the beginning portion (T6 to T7) of the light-emitting period (T6 to T8). The light-emitting device EL includes a diode-type light-emitting device having an anode connected to the source S of the drive transistor Trd and a cathode connected to the ground potential Vcath. In the correcting section, the light-emitting device EL is reversely biased between the anode and cathode thereof, and when the output current Ids extracted from the source S of the drive transistor Trd flows into the light-emitting device EL, the diode-type light-emitting device EL functions as the capacitance Coled. The additional capacitance Csub is connected parallelly to the capacitance Coled. With this arrangement, the time for which the output current Ids flows is increased, resulting in an increase in the time margin of operation of the mobility correcting section.

Figure 14:
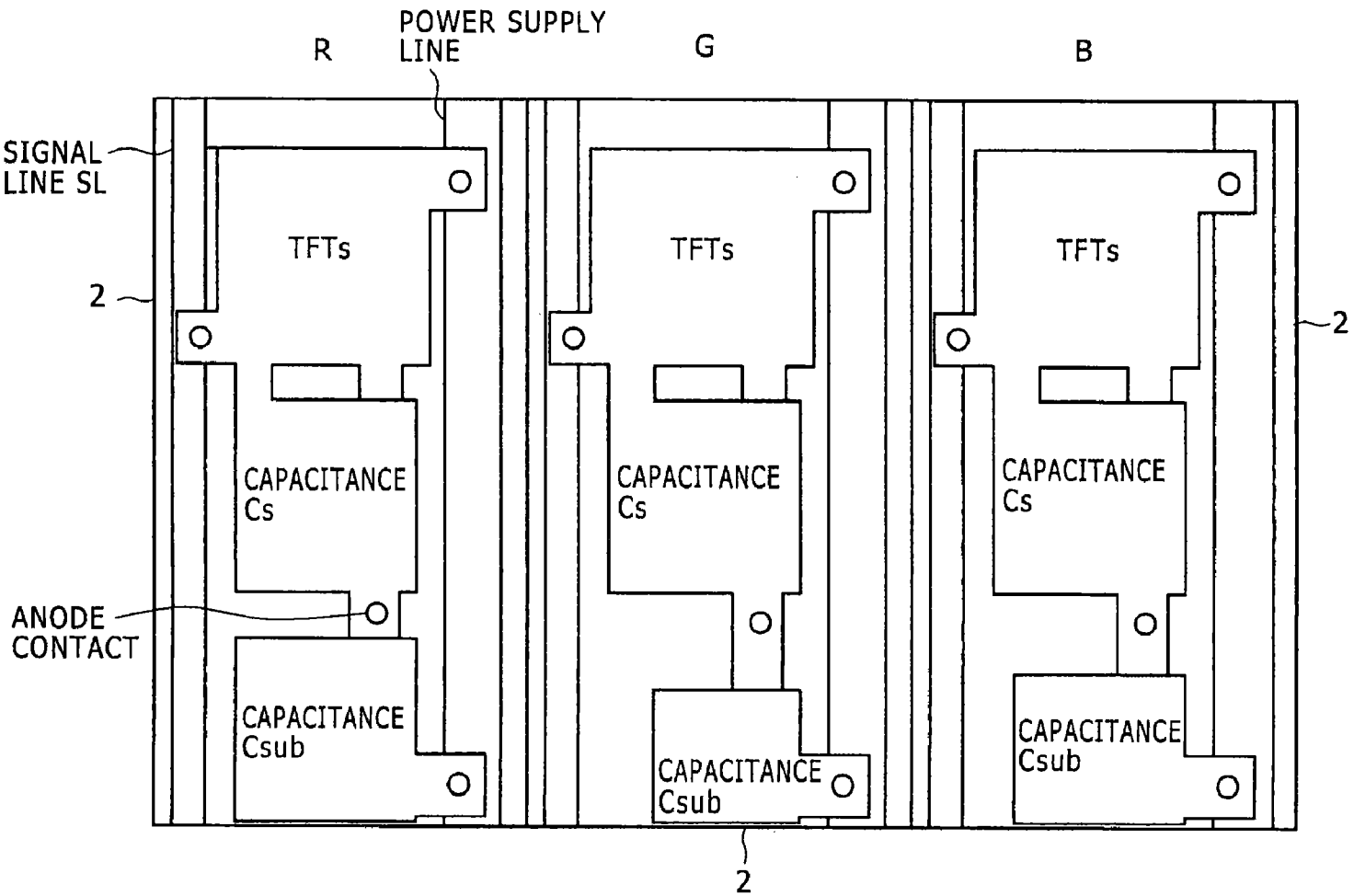
FIG. 14 is a fragmentary plan view of a display apparatus according to a third embodiment of the present invention.

FIG. 14 is a fragmentary plan view of a display apparatus according to a third embodiment of the present invention. FIG. 14 shows a set of red, green, and blue pixels. R, G, B pixel circuits 2 have a red light-emitting device, a green light-emitting device, and a blue light-emitting device, respectively. The additional capacitance Csub in each of the pixel circuits 2 has a capacitance value which is different for each light-emitting device, thereby making times requisite to operate respective correcting section in the R, G, B pixel circuits 2 uniform.

Generally, for producing R, G, B light-emitting devices, organic EL materials of which the light-emitting devices are to be made are coated differently for the colors R, G, B. Since the organic EL materials and their film thicknesses are different for the colors R, G, B, the light-emitting device capacitances Coled for the colors R, G, B are different from each other. If white organic EL light-emitting devices are colored with R, G, B filters and the R, G, B pixels have different aperture ratios, then the light-emitting device capacitances Coled for the colors R, G, B are also different from each other. Unless some countermeasures are taken, therefore, the capacitances C used to correct the mobility for the colors R, G, B are different from each other. Accordingly, the optimum mobility correcting periods t determined by the equation (5) for the R, G, B pixels are also different from each other. Consequently, it is difficult to adjust the mobility correcting periods for the R, G, B pixels to appropriate values unless some countermeasures are taken.

According to the present embodiment, the additional capacitances Csub for the respective colors R, G, B are of different values in order to employ a common optimum mobility correcting period among the R, G, B pixels. Since the light-emitting device capacitance Coled is determined by the pixel size, the pixel aperture ratio, and the basic properties of the light-emitting material, it is practically difficult to adjust the light-emitting device capacitances Coled of the respective pixels R, G, B to the same value. Unless some countermeasures are taken, therefore, the capacitances C used to correct the mobility for the colors R, G, B are different from each other, and the optimum mobility correcting periods t for the R, G, B pixels are also different from each other. According to the present embodiment, the additional capacitances Csub added to the respective R, G, B pixels are of different values.

In order for drain currents requisite for mobility correction to be identical and independent of the mobile correcting period among the different pixels, two different pixels need to satisfy the following equations (6):

$$\begin{cases} \sqrt{\frac{k'}{k}} = \frac{C'}{C} \\ \frac{V_{sig}}{V'_{sig}} = \frac{C'}{C} \end{cases} \tag{6}$$

In the equations (6), the parameters of one of the pixels are primed to distinguish those from the parameters of the other pixel. The relationship between the output current Ids and the video signal Vsig that flow through one of the pixels is expressed by the following equation (7), which is identical to the equation (5) described above:

$$I_{ds} = k\mu\left(\frac{1}{\frac{1}{V_{sig}} + \frac{k\mu}{C}t}\right)^2 \tag{7}$$

A size k' of the drive transistor, a level Vsig' of the input video signal, and a drain current Ids' flowing through a pixel having a different capacitance C are expressed by the following equation (8):

$$I'_{ds} = k'\mu\left(\frac{1}{\frac{1}{V'_{sig}} + \frac{k'\mu}{C'}t}\right)^2 \tag{8}$$

In order that Ids=Ids', the following equation (9) may be satisfied:

$$k\mu\left(\frac{1}{\frac{1}{V_{sig}} + \frac{k\mu}{C}t}\right)^2 = k'\mu\left(\frac{1}{\frac{1}{V'_{sig}} + \frac{k'\mu}{C'}t}\right)^2 \tag{9}$$

Both sides of the equation (9) are worked out to obtain the following equation (10):

$$\mu\left(\frac{\sqrt{k'}}{C'} - \frac{\sqrt{k}}{C}\right)t = \frac{1}{\sqrt{k}\,V_{sig}} - \frac{1}{\sqrt{k'}\,V'_{sig}} \tag{10}$$

In order for the condition expressed by the equation (10) not to depend on the correcting time t, the following relationships need to be satisfied:

$$\frac{\sqrt{k'}}{C'} = \frac{\sqrt{k}}{C} \text{ and } \frac{1}{\sqrt{k}\,V_{sig}} = \frac{1}{\sqrt{k'}\,V'_{sig}}$$

These relationships are rewritten into the equations (6). If C, C' satisfy the conditions given by the equations (6) with respect to different values of Vsig, k, then it is possible to provide a common correcting time t for all the pixels.

According to the above equations (6), if the dynamic range of the input video signal Vsig and the size factor k of the drive transistor Trd are identical for the R, G, B pixels, then the capacitances C in the respective R, G, B pixels need to be identical in order to provide the common correcting time t for the R, G, B pixels. The capacitance C is represented by C=Cs+Coled+Csub. The capacitance Coled has a different value for each of the R, G, B pixels. It is difficult to change greatly each of the R, G, B pixels because the capacitance Cs has a bootstrap gain. Basically, the capacitance Cs needs to be of a common value for the R, G, B pixels. According to the present embodiment, capacitances Csub having different values for the respective R, G, B pixels are connected parallelly to the respective capacitances Coled. The capacitance C used for mobility correction is represented by C=Cs+Coled+Csub. In order to employ the same capacitance C in the R, G, B pixels, the value of the additional capacitance Csub is adjusted for each of the R, G, B pixels. In this manner, the equations (6) are satisfied, and the common mobility correcting time t is provided for the R, G, B pixels. Even if the size factor k of the drive transistor Trd and the dynamic range of the input video signal Vsig are different for the R, G, B pixels, the same time t optimum for mobility correction can be established for the R, G, B pixels by adjusting the additional capacitance Csub for each of the R, G, B pixels so that the equations (6) will be satisfied.

If it is necessary to adjust the white balance among the R, G, B pixels, the above equations (6) can be modified into the following equations (11):

$$\begin{cases} \sqrt{\frac{k'}{k}\alpha} = \frac{C'}{C} \\ \frac{V_{sig}}{V'_{sig}}\alpha = \frac{C'}{C} \end{cases} \tag{11}$$

If the white balance adjustment is requisite, then it is assumed that the output current for each of the R, G, B pixels differs α times. In order that Ids'=αIds, the following equation (12) needs to be satisfied:

$$\alpha k\mu\left(\frac{1}{\frac{1}{V_{sig}} + \frac{k\mu}{C}t}\right)^2 = k'\mu\left(\frac{1}{\frac{1}{V'_{sig}} + \frac{k'\mu}{C'}t}\right)^2 \tag{12}$$

Both sides of the equation (12) are worked out. In order for the condition not to depend on the correcting time t, the following equations (13) need to be satisfied:

$$\frac{\sqrt{k'\alpha}}{C'} = \frac{\sqrt{k}}{C} \text{ and } \frac{1}{\sqrt{k\alpha}\,V_{sig}} = \frac{1}{\sqrt{k'}\,V'_{sig}} \tag{13}$$

These equations are rewritten into the equations (11). If C, C' satisfy the conditions given by the equations (11) with respect to different values of Vsig, k, then it is possible to provide a common correcting time t for all the pixels.

Figure 15:
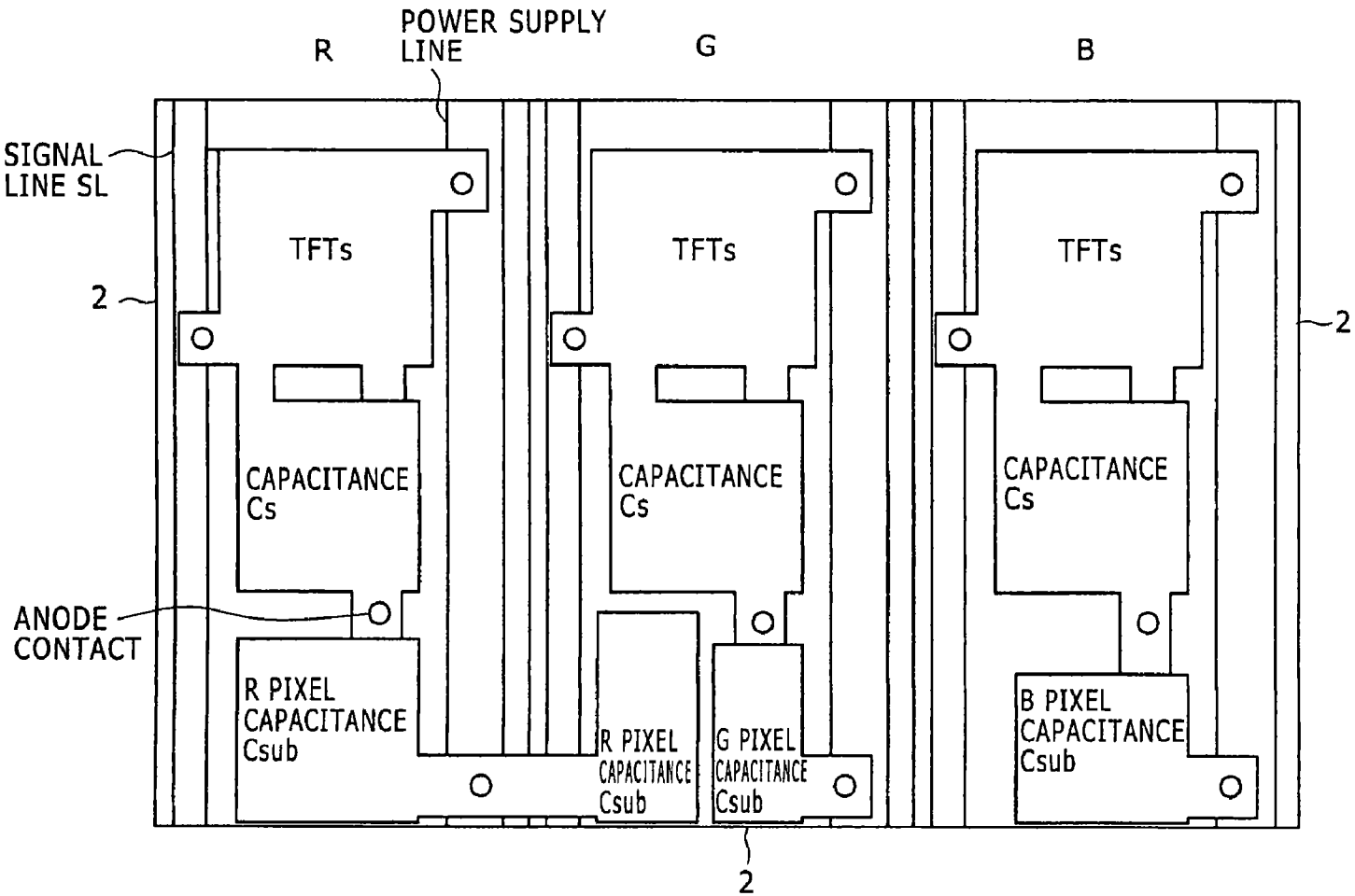
FIG. 15 is a fragmentary plan view of a display apparatus according to a fourth embodiment of the present invention.

FIG. 15 is a fragmentary plan view of a display apparatus according to a fourth embodiment of the present invention. The display apparatus according to the fourth embodiment is basically similar to the display apparatus according to the third embodiment shown in FIG. 14. For an easier understanding of the fourth embodiment, those parts of the display apparatus according to the fourth embodiment which correspond to those of the display apparatus according to the third embodiment are denoted by corresponding reference characters. According to the fourth embodiment, a shortage of the capacitance value of the additional capacitance Csub in one of the R, G, B pixel circuits is made up for by the additional capacitance Csub in an adjacent one of the R, G, B pixel circuits. In FIG. 15, the capacitance value of the additional capacitance Csub in the red (R) pixel suffers a shortage, and such a shortage is made up for by a portion of the additional capacitance Csub in the green (G) pixel that is positioned adjacent to the red (R) pixel. Therefore, the G pixel includes both a portion of the capacitance Csub in the R pixel and the capacitance Csub in the G pixel. The additional capacitance Csub in the blue (B) pixel is sufficient and does not need to be made up for.

If the output currents of the R, G, B pixels have different level settings in order to achieve a white balance, then the conditions according to the equations (11) need to be satisfied to provide a common mobility correcting time t. Specifically, the difference between C and C' increases for white balance adjustment, and the value of the additional capacitance Csub needs to be greater accordingly. As described above, the additional capacitance Csub is provided by a thin-film capacitor formed on the insulating substrate. Each of the pixels includes thin-film transistors, another capacitor Cs, and interconnections, which pose a limitation on the area taken up by the additional capacitance Csub. Therefore, if the requisite value of the additional capacitance Csub is greater than the maximum capacitance value that one pixel can take, then it may be impossible for the pixels to have the same optimum mobility correcting time t unless some countermeasures are taken. According to the present embodiment, a shortage of the additional capacitance Csub in a pixel (the R pixel in FIG. 15) is made up for by an assigned portion of the additional capacitance Csub in an adjacent pixel (the G pixel in FIG. 15), so that the additional capacitance Csub in the R pixel will be of the requisite value. Since a portion of the additional capacitance Csub in a pixel is assigned to a shortage of additional capacitance Csub in an adjacent pixel, a uniformized optimum motility correcting time t is provided for the R, G, B pixels even if the R, G, B pixels have different white balances and the organic EL materials thereof have widely different characteristics, so that high a image uniformity is achieved over the screen.

Figure 16:
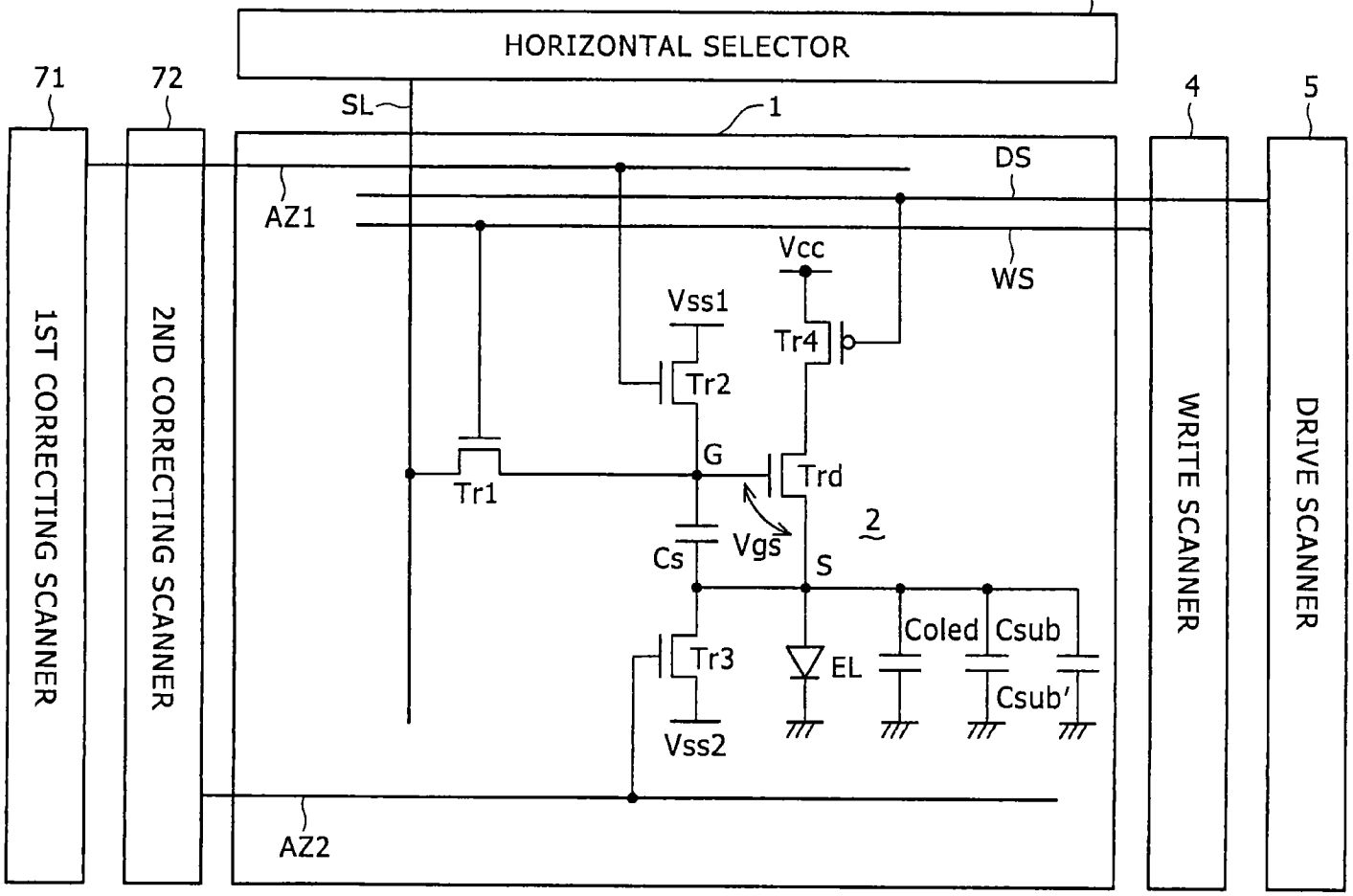
FIG. 16 is a circuit diagram, partly in block form, of the display apparatus according to the fourth embodiment shown in FIG. 15.

FIG. 16 is a circuit diagram, partly in block form, showing a circuit arrangement of the R pixel shown in FIG. 15. As shown in FIG. 16, the red (R) pixel circuit 2 includes an additional capacitance Csub' of an adjacent pixel as well as its own additional capacitance Csub to achieve a desired total capacitance C=Cs+Coled+Csub+Csub'.

Figure 17:
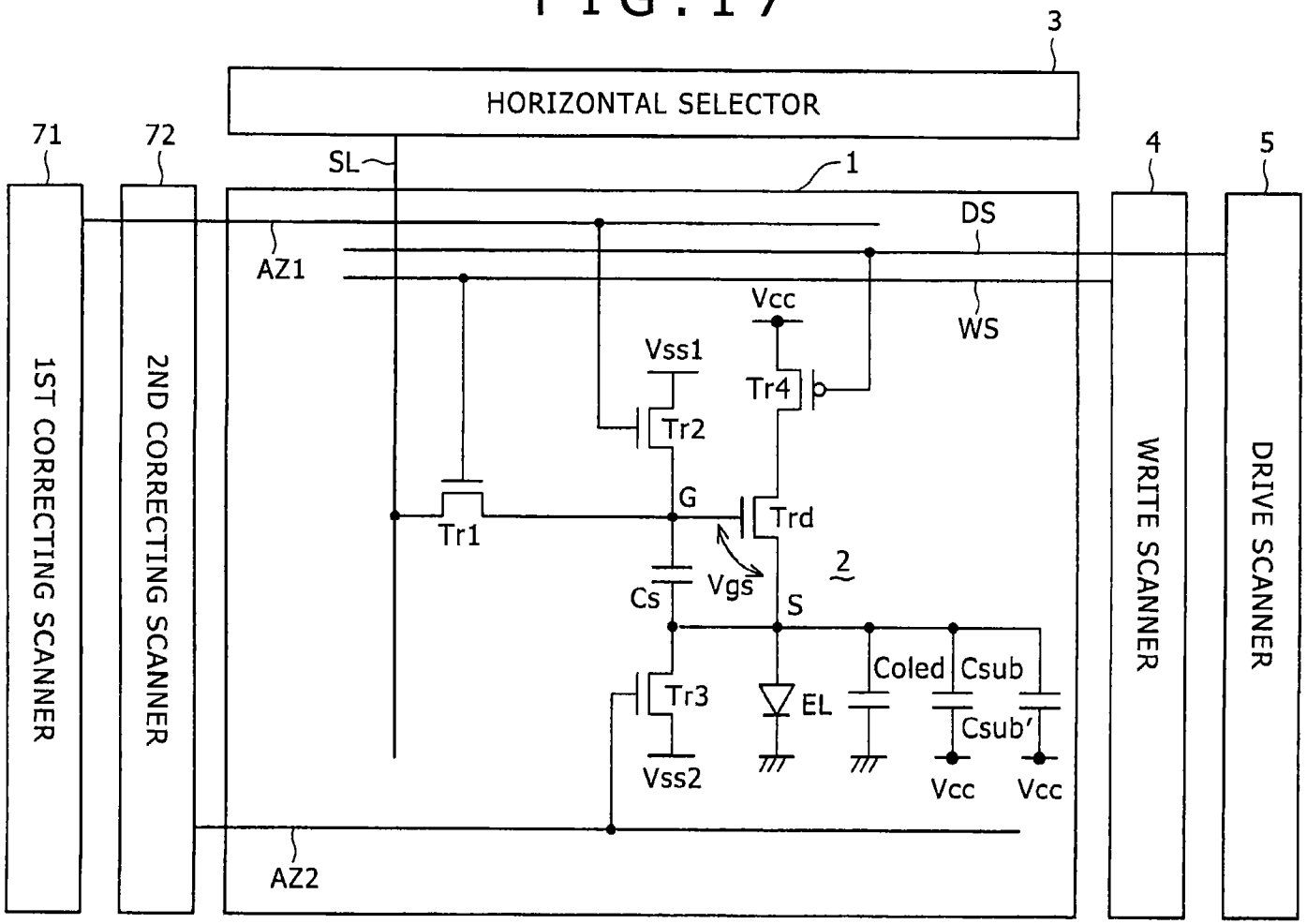
FIG. 17 is a circuit diagram, partly in block form, of a modification of the display apparatus according to the fourth embodiment shown in FIG. 16.

FIG. 17 is a circuit diagram, partly in block form, of a modification of the display apparatus according to the fourth embodiment shown in FIG. 16. For an easier understanding of the present modification, those parts of the display apparatus according to the modification which correspond to those of the display apparatus according to the fourth embodiment are denoted by corresponding reference characters. The display apparatus according to the modification differs from the display apparatus according to the fourth embodiment in that whereas the other terminals of the additional capacitances Csub, Csub' are connected to the ground potential on the ground potential on the cathode of the light-emitting device EL, the other terminals of the additional capacitances Csub, Csub' are connected to the power supply Vcc in the present modification.

Although certain preferred embodiments of the present invention have been shown and described in detail, it should be understood that various changes and modifications may be made therein without departing from the scope of the appended claims.

What is claimed is:

[1. A pixel circuit for being positioned at a point of intersection between a row scanning line for supplying a control signal and a column signal line for supplying a video signal, comprising at least:

a sampling transistor;

a pixel capacitance connected to said sampling transistor;

a drive transistor connected to said pixel capacitance;

a light-emitting device connected to said drive transistor;

wherein said sampling transistor is turned on in response to the control signal supplied from said scanning line to sample the video signal supplied from said signal line into said pixel capacitance, said pixel capacitance applies an input voltage to a gate of said drive transistor depending on the sampled video signal, said drive transistor supplies an output current depending on said input voltage to said light-emitting device, said output current having dependency on a carrier mobility in a channel region of said drive transistor, said light-emitting device emits light at a luminance level depending on said video signal in response to the output current supplied from said drive transistor, said pixel circuit further including correcting means for correcting the input voltage sampled in said pixel capacitance in order to cancel out the dependency of said output current on the carrier mobility, wherein said correcting means operates depending on the control signal supplied from said scanning line to extract the output current from said drive transistor and introduce the extracted output current into a capacitance of said light-emitting device and said pixel capacitance for thereby correcting the input voltage, and an additional capacitance added to the capacitance of said light-emitting device, wherein a portion of the output current extracted from said drive transistor flows into said additional capacitance to give a time margin to operation of said correcting means.]

[2. The pixel circuit according to claim 1, wherein said sampling transistor, said drive transistor, and said correcting means comprise thin-film transistors formed on an insulating substrate, and said pixel capacitance and said additional capacitance include thin-film capacitors formed on said insulating substrate.]

[3. The pixel circuit according to claim 1, wherein the output current of said drive transistor has dependency on a threshold voltage as well as the carrier mobility in the carrier region, and said correcting means detects a threshold voltage of said drive transistor and adds the detected threshold voltage to said input voltage in advance in order to cancel out the dependency of the output current on the threshold voltage.]

[4. The pixel circuit according to claim 1, wherein said light-emitting device comprises a diode-type light-emitting device having an anode connected to a source of said drive transistor and a cathode connected to ground, said additional capacitance having a terminal connected to the anode of said light-emitting device and another terminal connected to a predetermined fixed potential.]

[5. The pixel circuit according to claim 4, wherein said predetermined fixed potential to which another terminal of said additional capacitance is connected is selected from a ground potential on the cathode of said light-emitting device, and a positive power supply potential and a negative power supply potential of the pixel circuit.]

[6. The array of pixel circuits each according to claim 1, wherein each of said pixel circuits has either one of a red light-emitting device, a green light-emitting device, and a blue light-emitting device, or the additional capacitances in the respective pixel circuits have different capacitance values for the respective light-emitting devices for thereby making times requisite to operate the correcting means in the respective pixel circuits uniform.]

[7. The array of pixel circuits each according to claim 6, wherein a shortage of the capacitance value of the additional capacitance in one of said pixel circuits is made up for by a portion of the additional capacitance in an adjacent one of said pixel circuits.]

[8. The pixel circuit according to claim 1, wherein said correcting means extracts the output current from said drive transistor and supplies the extract output current to said pixel capacitance through a negative feedback loop to correct said input voltage while the video signal is being sampled in said pixel capacitance.]

[9. A display apparatus comprising:

a pixel array having a matrix of pixels each positioned at a point of intersection between a row scanning line for supplying a control signal and a column signal line for supplying a video signal;

a signal unit for supplying a video signal to said signal line; and a scanner unit for supplying a control signal to said scanning line to successively scan rows of the pixels;

each of said pixels including at least a sampling transistor, a pixel capacitance connected to said sampling transistor, a drive transistor connected to said pixel capacitance, a light-emitting device connected to said drive transistor, wherein said sampling transistor is turned on in response to the control signal supplied from said scanning line to sample the video signal supplied from said signal line into said pixel capacitance, said pixel capacitance applies an input voltage to a gate of said drive transistor depending on the sampled video signal, said drive transistor supplies an output current depending on said input voltage to said light-emitting device, said output current having dependency on a carrier mobility in a channel region of said drive transistor, said light-emitting device emits light at a luminance level depending on said video signal in response to the output current supplied from said drive transistor, each pixel of said pixels further including correcting means for correcting the input voltage sampled in said pixel capacitance in order to cancel out the dependency of said output current on the carrier mobility, wherein said correcting means operates depending on the control signal supplied from said scanning line to extract the output current from said drive transistor and introduce the extracted output current into a capacitance of said light-emitting device and said pixel capacitance thereby correcting the input voltage, and an additional capacitance added to the capacitance of said light-emitting device, wherein a portion of the output current extracted from said drive transistor flows into said additional capacitance to give a time margin to operation of said correcting means.]

[10. The display apparatus according to claim 9, wherein said sampling transistor, said drive transistor, and said correcting means comprise thin-film transistors formed on an insulating substrate, and said pixel capacitance and said additional capacitance include thin-film capacitors formed on said insulating substrate.]

[11. The display apparatus according to claim 9, wherein the output current of said drive transistor has dependency on a threshold voltage as well as the carrier mobility in the carrier region, and said correcting means detects a threshold voltage of said drive transistor and adds the detected threshold voltage to said input voltage in advance in order to cancel out the dependency of the output current on the threshold voltage.]

[12. The display apparatus according to claim 9, wherein said light-emitting device comprises a diode-type light-emitting device having an anode connected to a source of said drive transistor and a cathode connected to ground, and said additional capacitance has a terminal connected to the anode of said light-emitting device and another terminal connected to a predetermined fixed potential.]

[13. The display apparatus according to claim 12, wherein said predetermined fixed potential to which another terminal of said additional capacitance is connected is selected from a ground potential on the cathode of said light-emitting device, and a positive power supply potential and a negative power supply potential of the pixel circuit.]

[14. The display apparatus according to claim 9, wherein each of said pixels has either one of a red light-emitting device, a green light-emitting device, or a blue light-emitting device, and the additional capacitances in the respective pixels have different capacitance values for the respective light-emitting devices thereby making times requisite to operate the correcting means in the respective pixels uniform.]

[15. The display apparatus according to claim 14, wherein a shortage of the capacitance value of the additional capacitance in one of said pixels is made up for by a portion of the additional capacitance in an adjacent one of said pixels.]

[16. The display apparatus according to claim 9, wherein said correcting means extracts the output current from said drive transistor and supplies the extract output current to said pixel capacitance through a negative feedback loop to correct said input voltage while the video signal is being sampled in said pixel capacitance.]

*17. A pixel circuit for being positioned at a point of intersection between a row scanning line for supplying a control signal and a column signal line for supplying a video signal, comprising at least:*

*a sampling transistor;*

*a pixel capacitance;*

*a drive transistor;*

*a light-emitting device;*

*wherein said sampling transistor is turned on in response to the control signal supplied from said row scanning line to sample the video signal supplied from said signal line into said pixel capacitance,*

*said pixel capacitance applies an input voltage to a gate of said drive transistor depending on the sampled video signal,*

*said drive transistor supplies an output current depending on said input voltage to said light-emitting device,*

*said light-emitting device emits light at a luminance level depending on said video signal in response to said output current supplied from said drive transistor,*

*said pixel circuit corrects the input voltage sampled in said pixel capacitance,*

*wherein the output current from said drive transistor is extracted into said pixel capacitance, and*

*an additional capacitance added to said pixel capacitance, a portion of said output current from the drive transistor flowing into said additional capacitance.*

*18. The pixel circuit according to claim 17, wherein said sampling transistor and said drive transistor comprise thin-film transistors formed on an insulating substrate, and said pixel capacitance and said additional capacitance include thin-film capacitors formed on said insulating substrate.*

*19. The pixel according to claim 17, further including correcting means for correcting the input voltage sampled in said pixel capacitance in order to cancel out the dependency of said output current on the carrier mobility.*

*20. The pixel circuit according to claim 19, wherein the output current of said drive transistor has dependency on a threshold voltage as well as the carrier mobility in the carrier region, and said correcting means detects a threshold voltage of said drive transistor and adds the detected threshold voltage to said input voltage in advance in order to cancel out the dependency of the output current on the threshold voltage.*

*21. The array of pixel circuits each according to claim 20, wherein each of said pixel circuits has either one of a red light-emitting device, a green light-emitting device, and a blue light-emitting device, or the additional capacitances in the respective pixel circuits have different capacitance values for the respective light-emitting devices for thereby making times requisite to operate the correcting means in the respective pixel circuits uniform.*

*22. The array of pixel circuits each according to claim 21, wherein a shortage of the capacitance value of the additional capacitance in one of said pixel circuits is made up for by a portion of the additional capacitance in an adjacent one of said pixel circuits.*

*23. The pixel circuit according to claim 19, wherein said correcting means extracts the output current from said drive transistor and supplies the extract output current to said pixel capacitance through a negative feedback loop to correct said input voltage while the video signal is being sampled in said pixel capacitance.*

*24. A pixel circuit for being positioned at a point of intersection between a row scanning line for supplying a control signal and a column signal line for supplying a video signal, comprising at least:*

*a sampling transistor;*

*a pixel capacitance;*

*a drive transistor;*

*a light-emitting device;*

*wherein said sampling transistor is turned on in response to the control signal supplied from said row scanning line to sample the video signal supplied from said signal line into said pixel capacitance,*

*said pixel capacitance applies an input voltage to a gate of said drive transistor depending on the sampled video signal,*

*said drive transistor supplies an output current depending on said input voltage to said light-emitting device,*

*said light-emitting device emits light at a luminance level depending on said video signal in response to said output current supplied from said drive transistor,*

*said pixel circuit corrects the input voltage sampled in said pixel capacitance,*

*wherein the output current from said drive transistor is extracted into said pixel capacitance, and*

*an additional capacitance added to said pixel capacitance,*

*wherein said light-emitting device comprises an anode connected to a source of said drive transistor and a cathode connected to ground, said additional capacitance having a terminal connected to the anode of said light-emitting device and another terminal connected to a predetermined fixed potential.*

*25. The pixel circuit according to claim 24, wherein said predetermined fixed potential to which another terminal of said additional capacitance is connected is selected from a ground potential on the cathode of said light-emitting device, and a positive power supply potential and a negative power supply potential of the pixel circuit.*

*26. A display apparatus comprising:*

*a pixel array having a matrix of pixels each positioned at a point of intersection between a row scanning line for supplying a control signal and a column signal line for supplying a video signal; a signal unit for supplying a video signal to said signal line; and a scanner unit for supplying a control signal to said row scanning line to successively scan rows of the pixels; each of said pixels including at least*

*a sampling transistor,*

*a pixel capacitance,*

*a drive transistor,*

*a light-emitting device,*

*wherein said sampling transistor is turned on in response to the control signal supplied from said row scanning line to sample the video signal supplied from said signal line into said pixel capacitance,*

*said pixel capacitance applies an input voltage to a gate of said drive transistor depending on the sampled video signal,*

*said drive transistor supplies an output current depending on said input voltage to said light-emitting device,*

*said light-emitting device emits light at a luminance level depending on said video signal in response to said output current supplied from said drive transistor,*

*said pixel circuit corrects the input voltage sampled in said pixel capacitance,*

*wherein the output current from said drive transistor is extracted into said pixel capacitance, and*

*an additional capacitance added to said pixel capacitance, a portion of said output current from the drive transistor flowing into said additional capacitance.*

*27. The display apparatus according to claim 26, further including correcting means for correcting the input voltage sampled in said pixel capacitance in order to cancel out the dependency of said output current on the carrier mobility.*

*28. The display apparatus according to claim 27, wherein each of said pixels has either one of a red light-emitting device, a green light-emitting device, or a blue light-emitting device, and the additional capacitances in the respective pixels have different capacitance values for the respective light-emitting devices thereby making times requisite to operate the correcting means in the respective pixels uniform.*

*29. The display apparatus according to claim 28, wherein a shortage of the capacitance value of the additional capacitance in one of said pixels is made up for by a portion of the additional capacitance in an adjacent one of said pixels.*

*30. The display apparatus according to claim 27, wherein said correcting means extracts the output current from said drive transistor and supplies the extract output current to said pixel capacitance through a negative feedback loop to correct said input voltage while the video signal is being sampled in said pixel capacitance.*

*31. The display apparatus according to claim 26, wherein said sampling transistor and said drive transistor comprise thin-film transistors formed on an insulating substrate, and said pixel capacitance and said additional capacitance include thin-film capacitors formed on said insulating substrate.*

*32. The display apparatus according to claim 31, wherein the output current of said drive transistor has dependency on a threshold voltage as well as the carrier mobility in the carrier region, and said correcting means detects a threshold voltage of said drive transistor and adds the detected threshold voltage to said input voltage in advance in order to cancel out the dependency of the output current on the threshold voltage.*

*33. A display apparatus comprising:*

*a pixel array having a matrix of pixels each positioned at a point of intersection between a row scanning line for supplying a control signal and a column signal line for supplying a video signal; a signal unit for supplying a video signal to said signal line; and a scanner unit for supplying a control signal to said row scanning line to successively scan rows of the pixels; each of said pixels including at least*

*a sampling transistor,*

*a pixel capacitance,*

*a drive transistor,*

*a light-emitting device,*

*wherein said sampling transistor is turned on in response to the control signal supplied from said row scanning line to sample the video signal supplied from said signal line into said pixel capacitance,*

*said pixel capacitance applies an input voltage to a gate of said drive transistor depending on the sampled video signal,*

*said drive transistor supplies an output current depending on said input voltage to said light-emitting device,*

*said light-emitting device emits light at a luminance level depending on said video signal in response to said output current supplied from said drive transistor,*

*said pixel circuit corrects the input voltage sampled in said pixel capacitance,*

*wherein the output current from said drive transistor is extracted into said pixel capacitance, and*

*an additional capacitance added to said pixel capacitance,*

*wherein said light-emitting device comprises an anode connected to a source of said drive transistor and a cathode connected to ground, and said additional capacitance has a terminal connected to the anode of said light-emitting device and another terminal connected to a predetermined fixed potential.*

*34. The display apparatus according to claim 33, wherein said predetermined fixed potential to which another terminal of said additional capacitance is connected is selected from a ground potential on the cathode of said light-emitting device, and a positive power supply potential and a negative power supply potential of the pixel circuit.*

*35. A pixel circuit comprising:*

*a sampling transistor;*

*a pixel capacitance;*

*a drive transistor; and*

*a light-emitting device;*

*wherein said sampling transistor is turned on in response to a control signal to sample a video signal into said pixel capacitance,*

*said pixel capacitance is configured to apply an input voltage to a gate of said drive transistor depending on the sampled video signal,*

*said drive transistor is configured to supply an output current depending on said input voltage to said light-emitting device, and*

*said drive transistor is configured to supply a compensation current into said pixel capacitance and an additional capacitance before supplying the output current into said light-emitting device.*

*36. A display apparatus comprising: a pixel array having a matrix of pixels, each of said pixels including*

*a sampling transistor,*

*a pixel capacitance,*

*a drive transistor, and*

*a light-emitting device,*

*wherein said sampling transistor is turned on in response to a control signal to sample a video signal into said pixel capacitance,*

*said pixel capacitance is configured to apply an input voltage to a gate of said drive transistor depending on the sampled video signal,*

*said drive transistor is configured to supply an output current depending on said input voltage to said light-emitting device, and*

*said drive transistor is configured to supply a feedback current into said pixel capacitance and an additional capacitance before supplying the output current into said light-emitting device.*

*37. The display apparatus according to claim 36, further comprising a vertical scanner and a horizontal selector.*

*38. The display apparatus according to claim 37, wherein said vertical scanner and said pixel array are formed on a glass substrate.*

*39. The display apparatus according to claim 37, wherein said vertical scanner is connected to a glass substrate by a flexible cable.*

*40. The display apparatus according to claim 36, wherein a period of supplying said feedback current into said pixel capacitance and additional capacitance is longer than 2.5 μs.*

*41. The display apparatus according to claim 36, wherein said sampling transistor is connected to said pixel capacitance directly.*

*42. The display apparatus according to claim 36, wherein each of said pixels has either one of a red light-emitting device, a green light-emitting device, or a blue light-emitting device, and thicknesses of each of light-emitting device are different.*

* * * * *